US012574134B2

(12) United States Patent
Lee

(10) Patent No.: US 12,574,134 B2
(45) Date of Patent: Mar. 10, 2026

(54) RADIO SYSTEM, VEHICLE INCLUDING SAME AND METHOD OF SETTING RADIO FREQUENCY

(71) Applicants: Hyundai Motor Company, Seoul (KR); Kia Corporation, Seoul (KR)

(72) Inventor: Sang Heun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 181 days.

(21) Appl. No.: 18/386,525

(22) Filed: Nov. 2, 2023

(65) Prior Publication Data

US 2024/0405904 A1 Dec. 5, 2024

(30) Foreign Application Priority Data

Jun. 2, 2023 (KR) ........................ 10-2023-0071612

(51) Int. Cl.
*H04H 40/18* (2008.01)
*H04H 20/10* (2008.01)

(52) U.S. Cl.
CPC .......... *H04H 40/18* (2013.01); *H04H 20/106* (2013.01); *H04H 2201/13* (2013.01)

(58) Field of Classification Search
CPC ........................................................ H03J 7/285
See application file for complete search history.

(56) References Cited

U.S. PATENT DOCUMENTS 4,271,434 A * 6/1981 Sakamoto ............... H03J 7/285 331/DIG. 2
4,525,866 A * 6/1985 Templin .................. H03J 7/285 455/166.2
4,723,319 A * 2/1988 Stricker .................... H03J 7/18 455/200.1
4,969,209 A * 11/1990 Schwob ................ H03J 1/0075 455/158.5
5,239,701 A * 8/1993 Ishii ........................ H03J 7/285 455/200.1
5,321,851 A * 6/1994 Sugayama ........... H03G 3/3052 455/161.3

(Continued)

FOREIGN PATENT DOCUMENTS

CA 2240425 A1 * 2/1999 ............ H03J 1/0066
CA 2750385 A1 * 2/2012 ............. H04H 20/26

(Continued)

*Primary Examiner* — Berhanu Tadese
(74) *Attorney, Agent, or Firm* — MORGAN, LEWIS & BOCKIUS LLP

(57) ABSTRACT

A radio system includes an audio device, and a control device operatively connected to the audio device to store a first radio frequency of the audio device as a preset frequency, wherein the control device may be configured to determine whether a second broadcast signal received through a second radio frequency is equal to a first broadcast signal received through the first radio frequency stored in a preset list when the second radio frequency of the audio device is added as the preset frequency, generate the preset list including the first and second radio frequencies when the first broadcast signal is different from the second broadcast signal, and generate the preset list including the first or second radio frequency when the first and second broadcast signals are broadcast signals of a same radio broadcast.

18 Claims, 14 Drawing Sheets

(56) References Cited

U.S. PATENT DOCUMENTS

| | | | | | |
|---|---|---|---|---|---|
| 5,654,719 | A * | 8/1997 | Kunii | H04H 60/51 | 455/154.1 |
| 6,021,320 | A * | 2/2000 | Bickford | H03J 1/0075 | 455/185.1 |
| 6,470,178 | B1 * | 10/2002 | Cummings-Hill | H04H 60/47 | 455/345 |
| 7,787,842 | B2 * | 8/2010 | Yoshida | H04H 40/18 | 455/161.3 |
| 8,140,002 | B2 * | 3/2012 | Kim | H04H 20/22 | 455/414.2 |
| 8,165,546 | B2 * | 4/2012 | Ingrassia | H04H 20/08 | 455/185.1 |
| 8,548,408 | B2 * | 10/2013 | Jaisimha | H04H 20/22 | 455/185.1 |
| 8,774,860 | B2 * | 7/2014 | Mason | H04H 60/41 | 455/62 |
| 9,065,574 | B2 * | 6/2015 | Buch | H04H 20/22 | |
| 9,148,128 | B2 * | 9/2015 | Jaisimha | H03J 7/18 | |
| 9,300,413 | B2 * | 3/2016 | Jaisimha | H04H 60/31 | |
| 9,531,487 | B2 * | 12/2016 | Jaisimha | H04H 40/27 | |
| 9,602,081 | B2 * | 3/2017 | Jaisimha | H03J 7/183 | |
| 9,853,755 | B2 * | 12/2017 | Jaisimha | H04H 60/51 | |
| 9,959,744 | B2 * | 5/2018 | Koskan | G08B 23/00 | |
| 10,728,713 | B2 * | 7/2020 | Park | H04W 4/48 | |
| 11,038,657 | B2 * | 6/2021 | Zhou | H04W 72/0453 | |
| 11,206,624 | B2 * | 12/2021 | Ko | H04L 5/0053 | |
| 11,228,880 | B2 * | 1/2022 | Aldana | H04W 8/005 | |
| 11,438,836 | B2 * | 9/2022 | Shrivastava | H04L 5/0032 | |
| 11,452,032 | B2 * | 9/2022 | Gupta | H04W 24/08 | |
| 11,653,292 | B2 * | 5/2023 | Azizi | H04W 52/0261 | 370/329 |
| 11,979,801 | B2 * | 5/2024 | Badic | H04W 72/51 | |
| 12,302,391 | B2 * | 5/2025 | Mueck | H04W 80/02 | |
| 2001/0044284 | A1 * | 11/2001 | Odashima | H04H 40/18 | 455/345 |
| 2002/0072341 | A1 * | 6/2002 | Ricard | H04B 1/16 | 455/184.1 |
| 2004/0137866 | A1 * | 7/2004 | Miyamura | H04H 20/57 | 455/185.1 |
| 2005/0227649 | A1 * | 10/2005 | Chestnut | H04B 1/205 | 455/154.1 |
| 2006/0135178 | A1 * | 6/2006 | Allyn | G08B 21/023 | 455/456.2 |
| 2006/0166675 | A1 * | 7/2006 | Yoon | H04H 60/41 | 455/452.2 |
| 2006/0223467 | A1 * | 10/2006 | Mason | H04H 60/41 | 455/185.1 |
| 2007/0060082 | A1 * | 3/2007 | Okumura | H04N 21/482 | 455/179.1 |
| 2008/0045167 | A1 * | 2/2008 | Yoshida | H04H 60/43 | 455/131 |
| 2008/0064425 | A1 * | 3/2008 | Kim | H04N 19/187 | 375/240.1 |
| 2008/0106464 | A1 * | 5/2008 | Kim | H04H 20/22 | 455/161.3 |
| 2010/0178938 | A1 * | 7/2010 | Ingrassia, Jr. | H04H 60/51 | 455/185.1 |
| 2010/0203855 | A1 * | 8/2010 | Komiyama | H04H 40/18 | 455/150.1 |
| 2011/0076972 | A1 * | 3/2011 | Cooley | H03L 1/00 | 455/154.1 |
| 2013/0065507 | A1 * | 3/2013 | Kitazato | H04H 60/46 | 455/3.01 |
| 2013/0072107 | A1 * | 3/2013 | Kitazato | H04H 60/50 | 455/3.01 |
| 2014/0213175 | A1 * | 7/2014 | Jaisimha | H04H 40/27 | 455/3.06 |
| 2015/0011156 | A1 * | 1/2015 | Turner | H04H 60/27 | 455/3.06 |
| 2015/0131548 | A1 * | 5/2015 | Kitazato | H04H 60/43 | 370/329 |
| 2015/0310725 | A1 * | 10/2015 | Koskan | G10L 15/02 | 704/274 |
| 2016/0164620 | A1 * | 6/2016 | Jaisimha | H04H 40/27 | 455/3.06 |
| 2017/0070303 | A1 * | 3/2017 | Jaisimha | H04H 60/31 | |
| 2018/0248637 | A1 * | 8/2018 | Husmann | H04H 60/51 | |
| 2019/0182631 | A1 * | 6/2019 | Park | H04W 4/48 | |
| 2022/0046728 | A1 * | 2/2022 | Kopchinsky | H04L 67/12 | |
| 2024/0075289 | A1 * | 3/2024 | Løngaa | A61N 1/3787 | |
| 2024/0405904 | A1 * | 12/2024 | Lee | H04H 20/106 | |
| 2024/0406627 | A1 * | 12/2024 | Yu | H04R 3/04 | |
| 2025/0159610 | A1 * | 5/2025 | Fu | H04W 72/0453 | |
| 2025/0159738 | A1 * | 5/2025 | Kopchinsky | H04W 4/40 | |

FOREIGN PATENT DOCUMENTS

| | | | | |
|---|---|---|---|---|
| CN | 1040600 | C * | 11/1998 | |
| CN | 1212387 | A * | 3/1999 | H03J 1/0066 |
| CN | 1213911 | A * | 4/1999 | H04H 20/55 |
| CN | 1251709 | A * | 4/2000 | H04B 1/1646 |
| CN | 1543080 | A * | 11/2004 | H04N 5/50 |
| CN | 1192287 | C * | 3/2005 | H03J 1/0066 |
| CN | 1812273 | A * | 8/2006 | H04H 20/12 |
| CN | 1327626 | C * | 7/2007 | H04N 21/4383 |
| CN | 101142772 | A * | 3/2008 | H04B 1/034 |
| CN | 101911550 | A * | 12/2010 | H03J 1/0075 |
| CN | 102067461 | B * | 7/2013 | H03J 1/0075 |
| CN | 101911550 | B * | 1/2014 | H03J 1/0066 |
| CN | 103935309 | A * | 7/2014 | |
| CN | 203996037 | U * | 12/2014 | H04H 20/55 |
| CN | 104737546 | A * | 6/2015 | H04H 60/43 |
| CN | 105246025 | A * | 1/2016 | H04W 4/40 |
| CN | 101142772 | B * | 10/2016 | H04B 1/034 |
| CN | 106100947 | A * | 11/2016 | H04L 12/2803 |
| CN | 107396324 | A * | 11/2017 | H04W 4/06 |
| CN | 107431882 | A * | 12/2017 | H04W 4/80 |
| CN | 104737546 | B * | 9/2018 | H04W 48/16 |
| CN | 105246025 | B * | 9/2018 | H04W 4/40 |
| CN | 109005523 | A * | 12/2018 | H04W 40/16 |
| CN | 109120363 | A * | 1/2019 | H04H 60/37 |
| CN | 109413592 | A * | 3/2019 | H04M 1/72418 |
| CN | 110784820 | A * | 2/2020 | H04W 4/06 |
| CN | 109005523 | B * | 3/2020 | H04W 72/0446 |
| CN | 106100947 | B * | 7/2020 | H04W 4/06 |
| CN | 106797283 | B * | 11/2020 | H04L 1/1812 |
| CN | 113015148 | A * | 6/2021 | G16H 50/80 |
| CN | 109413592 | B * | 7/2021 | H04M 1/72448 |
| CN | 116134848 | A * | 5/2023 | H04W 72/12 |
| CN | 113015148 | B * | 6/2023 | H04W 4/06 |
| CN | 117336663 | A * | 1/2024 | H04W 4/025 |
| CN | 117955760 | A * | 4/2024 | H04W 4/90 |
| CN | 118078253 | A * | 5/2024 | H04W 4/06 |
| CN | 117955760 | B * | 7/2024 | H04W 4/90 |
| CN | 119071693 | A * | 12/2024 | H04W 4/40 |
| CN | 119071914 | A * | 12/2024 | H04R 3/00 |
| CN | 116134848 | B * | 5/2025 | H04W 72/12 |
| DE | 2920180 | C2 * | 8/1988 | H03J 7/285 |
| DE | 3934314 | A1 * | 4/1990 | G08G 1/094 |
| DE | 19640867 | A1 * | 4/1997 | H04H 60/43 |
| DE | 102004017490 | A1 * | 10/2004 | H03J 1/0075 |
| DE | 102005014551 | A1 * | 11/2005 | H04B 1/205 |
| DE | 112005000067 | T5 * | 8/2006 | H04H 60/73 |
| DE | 69836527 | T2 * | 9/2007 | H03J 1/0083 |
| DE | 102008044078 | A1 * | 5/2010 | H04B 1/082 |
| DE | 102011113133 | A1 * | 3/2013 | H04H 40/18 |
| DE | 102011113133 | B4 * | 4/2013 | H04H 40/18 |
| DE | 102018215539 | A1 * | 6/2019 | H04W 4/40 |
| EP | 0301770 | A2 * | 2/1989 | H04N 5/44 |
| EP | 0428170 | A2 * | 5/1991 | H04B 1/16 |
| EP | 0428173 | A2 * | 5/1991 | H03G 3/3052 |
| EP | 0428170 | B1 * | 2/1996 | H04B 1/16 |
| EP | 0428173 | B1 * | 8/1996 | H03J 7/285 |
| EP | 0899876 | A1 * | 3/1999 | H03J 1/0058 |
| EP | 0899876 | B1 * | 10/2003 | H03J 1/0066 |
| EP | 1139574 | B1 * | 12/2004 | H04H 60/51 |
| EP | 2560287 | A1 * | 2/2013 | H04B 1/16 |
| EP | 2560288 | A1 * | 2/2013 | H04H 60/70 |
| EP | 1867077 | B1 * | 12/2013 | H04B 1/034 |
| EP | 2866363 | A1 * | 4/2015 | H04H 60/53 |

(56) References Cited

FOREIGN PATENT DOCUMENTS

| | | | | | |
|---|---|---|---|---|---|
| EP | 2192693 | B1 | * | 6/2019 | H04B 1/082 |
| EP | 2866363 | B1 | * | 4/2020 | H04H 60/50 |
| EP | 4187944 | A1 | * | 5/2023 | H04W 72/12 |
| EP | 4152621 | B1 | * | 2/2024 | H04W 48/16 |
| GB | 2458649 | A | * | 9/2009 | H04H 20/62 |
| JP | H0758598 | A | * | 3/1995 | H04H 20/22 |
| JP | H07273604 | A | * | 10/1995 | H04H 60/51 |
| JP | H07297734 | A | * | 11/1995 | H04H 20/28 |
| JP | H0865188 | A | * | 3/1996 | H03J 1/0016 |
| JP | H09162817 | A | * | 6/1997 | H03J 1/0066 |
| JP | H11150487 | A | * | 6/1999 | H04H 60/64 |
| JP | 2004104215 | A | * | 4/2004 | H04H 20/57 |
| JP | 2004312563 | A | * | 11/2004 | H03J 1/0075 |
| JP | 2011254172 | A | * | 12/2011 | H04N 21/45 |
| JP | 2011254173 | A | * | 12/2011 | H04H 40/27 |
| JP | 2018191031 | A | * | 11/2018 | H04H 60/65 |
| KR | 100197097 | B1 | * | 6/1999 | H03J 1/0075 |
| KR | 100270568 | B1 | * | 11/2000 | H03J 1/0083 |
| KR | 100800869 | B1 | * | 2/2008 | H04H 60/51 |
| KR | 20080043434 | A | * | 5/2008 | H04W 72/0453 |
| KR | 20090119411 | A | * | 11/2009 | H04N 5/46 |
| KR | 20130080792 | A | * | 7/2013 | H04N 21/45 |
| KR | 20150142802 | A | * | 12/2015 | H03J 7/04 |
| KR | 20160012328 | A | * | 2/2016 | H03J 1/0008 |
| KR | 20160049290 | A | * | 5/2016 | H03J 1/0058 |
| KR | 20190068930 | A | * | 6/2019 | H04W 4/06 |
| KR | 101958885 | B1 | * | 7/2019 | H04H 60/70 |
| KR | 20190115274 | A | * | 10/2019 | H03J 1/0066 |
| KR | 20200076698 | A | * | 6/2020 | H04W 72/56 |
| KR | 20220090005 | A | * | 6/2022 | G11B 31/003 |
| KR | 20230044519 | A | * | 4/2023 | H04W 72/563 |
| KR | 20240020453 | A | * | 2/2024 | H03J 7/18 |
| KR | 20240114800 | A | * | 7/2024 | H04H 20/57 |
| KR | 20240172404 | A | * | 12/2024 | H03J 7/18 |
| KR | 20240172929 | A | * | 12/2024 | H04R 3/00 |
| KR | 20240172930 | A | * | 12/2024 | H04W 4/40 |
| NO | 318038 | B1 | * | 1/2005 | H04H 40/90 |
| WO | WO-9844663 | A1 | * | 10/1998 | H04B 1/1646 |
| WO | WO-2006106379 | A1 | * | 10/2006 | H04H 60/41 |
| WO | WO-2008062249 | A1 | * | 5/2008 | H04W 4/029 |
| WO | WO-2009040940 | A1 | * | 4/2009 | H03J 1/0091 |
| WO | WO-2011152245 | A1 | * | 12/2011 | H04B 1/16 |
| WO | WO-2011152246 | A1 | * | 12/2011 | H04N 21/482 |
| WO | WO-2011156350 | A2 | * | 12/2011 | H04H 20/22 |
| WO | WO-2014120634 | A1 | * | 8/2014 | H04H 60/51 |
| WO | WO-2015077767 | A1 | * | 5/2015 | G01S 1/7034 |
| WO | WO-2016036797 | A1 | * | 3/2016 | H04H 60/44 |
| WO | WO-2015077767 | A9 | * | 7/2016 | G01S 1/7034 |
| WO | WO-2016197622 | A1 | * | 12/2016 | H04W 4/06 |
| WO | WO-2018028038 | A1 | * | 2/2018 | H04W 72/23 |
| WO | WO-2018125686 | A2 | * | 7/2018 | H04W 52/0264 |
| WO | WO-2019010049 | A1 | * | 1/2019 | H04W 8/005 |
| WO | WO-2019143422 | A1 | * | 7/2019 | H04W 72/51 |
| WO | WO-2019191063 | A1 | * | 10/2019 | H04B 1/7073 |
| WO | WO-2022027441 | A1 | * | 2/2022 | H04W 72/563 |
| WO | WO-2023159445 | A1 | * | 8/2023 | H04W 52/0229 |

* cited by examiner

420

| | 401 RADIO FREQUENCY | 403 CURRENT LOCATION | 405 BROADCAST STATION NAME | 407 BROADCAST STATION LOCATION |
|---|---|---|---|---|
| 411 | 80.1 MHZ | area 1 | First Radio | area 1 |
| 413 | 82.1 MHZ | area 1 | First Radio | area 2 |
| 415 | 90.7 MHZ | area 1 | Second Radio | area 1 |
| 417 | 99.5 MHZ | area 1 | Third Radio | area 2 |

430

| | RADIO FREQUENCY | CURRENT LOCATION |
|---|---|---|
| 411 | 80.1 MHZ | First Radio |
| 415 | 90.7 MHZ | Second Radio |
| 417 | 99.5 MHZ | Third Radio |

440

| | RADIO FREQUENCY | CURRENT LOCATION | BROADCAST STATION NAME | BROADCAST STATION LOCATION |
|---|---|---|---|---|
| 411 | 80.1 MHZ | area 1 | First Radio | area 1 |
| 415 | 90.7 MHZ | area 1 | Second Radio | area 1 |

FIG.4

RADIO SYSTEM, VEHICLE INCLUDING SAME AND METHOD OF SETTING RADIO FREQUENCY

CROSS-REFERENCE TO RELATED APPLICATION

The present application claims priority to Korean Patent Application No. 10-2023-0071612, filed in the Korean Intellectual Attribute Office on Jun. 2, 2023, the entire contents of which is incorporated herein for all purposes by this reference.

BACKGROUND OF THE PRESENT DISCLOSURE

Field of the Present Disclosure

The present disclosure relates to a radio system, a vehicle including the same, and a method of setting a radio frequency, and more particularly, to a technique for managing radio frequencies registered in a preset list.

Description of Related Art

An audio device (e.g., a radio device) may be installed in a vehicle, and a passenger may listen to a radio broadcast received through the audio device. For example, the audio device may search for a radio frequency corresponding to a radio broadcast (e.g., a radio program) receivable in the area where the vehicle travels, and may receive a broadcast signal of the found radio frequency.

In general, an audio device may provide a preset function of pre-storing a radio frequency to be listened to. Accordingly, the occupant may easily and rapidly listen to the radio broadcast by selecting a preset frequency stored in advance.

The information included in this Background of the present disclosure is only for enhancement of understanding of the general background of the present disclosure and may not be taken as an acknowledgement or any form of suggestion that this information forms the related art already known to a person skilled in the art.

BRIEF SUMMARY

Various aspects of the present disclosure are directed to providing a manual storage mode in which an occupant directly selects and stores a radio frequency and an automatic storage mode in which an audio device automatically selects and stores a radio frequency with good reception while scanning radio frequencies.

For example, in the automatic storage mode, an audio device may receive a broadcast signal while scanning based on the lowest radio frequency among receivable radio frequencies, and store the radio frequency of the broadcast signal with good reception as a preset frequency.

However, the number of preset frequencies which may be stored in the automatic storage mode may be limited to a pre-predetermined number. Accordingly, while an audio device operates in the automatic storage mode, a relatively low radio frequency may be stored as a preset frequency and a relatively high radio frequency may not be stored as a preset frequency.

Therefore, various, various aspects of the present disclosure are directed to providing a radio system configured for generating a preset list including relatively high radio frequencies as well as relatively low radio frequencies among receivable radio frequencies.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a radio system includes an audio device, and a control device operatively connected to the audio device to store a first radio frequency of the audio device as a preset frequency, wherein the control device may be configured to determine whether a second broadcast signal received through a second radio frequency is equal to a first broadcast signal received through the first radio frequency stored in a preset list when the second radio frequency of the audio device is added as the preset frequency, generate the preset list including the first radio frequency and the second radio frequency when the first broadcast signal is different from the second broadcast signal, and generate the preset list including the first radio frequency or the second radio frequency when the first broadcast signal and the second broadcast signal are broadcast signals of a same radio broadcast.

According to various exemplary embodiments of the present disclosure, the control device may automatically select the second radio frequency corresponding to the second broadcast signal having a reception sensitivity higher than or equal to a reference sensitivity while changing the first radio frequency at a predetermined interval, and add the selected second radio frequency as the preset frequency.

According to various exemplary embodiments of the present disclosure, the control device may output a user interface for radio frequency selection, and change the first radio frequency to the second radio frequency based on an input to the user interface and add the changed second radio frequency as the preset frequency.

According to various exemplary embodiments of the present disclosure, when the first broadcast signal and the second broadcast signal are broadcast signals of the same radio broadcast, the control device may obtain location information related to a vehicle, and generate the preset list by selecting one of the first radio frequency or the second radio frequency based on the location information.

According to various exemplary embodiments of the present disclosure, the control device may check at least one preset frequency related to a broadcast signal having a reception sensitivity less than a reference sensitivity in the preset list when movement of a vehicle is detected, and change the at least one preset frequency to an alternative frequency, wherein the alternative frequency includes another radio frequency through which the same radio broadcast as the radio broadcast received through the at least one preset frequency is transmitted.

According to various exemplary embodiments of the present disclosure, the control device may obtain information on the alternative frequency associated with the at least one preset frequency from inside the radio system or outside the radio system.

According to various exemplary embodiments of the present disclosure, the control device may check a current location of the vehicle, and check the information on the alternative frequency corresponding to the current location of the vehicle.

According to various exemplary embodiments of the present disclosure, the control device may check an inaudible preset frequency related to a moving path of a vehicle from the preset list, and change the inaudible preset frequency to a predetermined radio frequency, wherein the predetermined radio frequency includes audible radio frequencies of other radio broadcasts on the moving path.

According to various exemplary embodiments of the present disclosure, the radio system may further include a display that outputs the preset list, wherein the control device may output the inaudible preset frequency in a first scheme and output other preset frequencies excluding the inaudible preset frequency in a second scheme in the preset list output to the display.

According to various exemplary embodiments of the present disclosure, the radio system may further include an input device, wherein the control device may change the inaudible preset frequency selected through the input device to the predetermined radio frequency.

According to an aspect of the present disclosure, a method of operation a radio system includes storing a first radio frequency of an audio device as a preset frequency, determining whether a second broadcast signal received through a second radio frequency is equal to a first broadcast signal received through the first radio frequency stored in a preset list when the second radio frequency of the audio device is added as the preset frequency, generating the preset list including the first radio frequency and the second radio frequency when the first broadcast signal is different from the second broadcast signal, and generating the preset list including the first radio frequency or the second radio frequency when the first broadcast signal and the second broadcast signal are broadcast signals of a same radio broadcast.

According to various exemplary embodiments of the present disclosure, the method may further include automatically selecting the second radio frequency corresponding to the second broadcast signal having a reception sensitivity higher than or equal to a reference sensitivity while changing the first radio frequency at a predetermined interval, and adding the selected second radio frequency as the preset frequency.

According to various exemplary embodiments of the present disclosure, the method may further include outputting a user interface for radio frequency selection, and changing the first radio frequency to the second radio frequency based on an input to the user interface and adding the changed second radio frequency as the preset frequency.

According to various exemplary embodiments of the present disclosure, when the first broadcast signal and the second broadcast signal are broadcast signals of the same radio broadcast, the method may further include obtaining location information related to a vehicle, and generating the preset list by selecting one of the first radio frequency or the second radio frequency based on the location information.

According to various exemplary embodiments of the present disclosure, the method may further include checking at least one preset frequency related to a broadcast signal having a reception sensitivity less than a reference sensitivity in the preset list when movement of a vehicle is detected, and changing the at least one preset frequency to an alternative frequency, wherein the alternative frequency may include another radio frequency through which the same radio broadcast as the radio broadcast received through the at least one preset frequency is transmitted.

According to various exemplary embodiments of the present disclosure, the method may further include obtaining information on the alternative frequency associated with the at least one preset frequency from inside the radio system or outside the radio system.

According to various exemplary embodiments of the present disclosure, the method may further include checking a current location of the vehicle, and checking the information on the alternative frequency corresponding to the current location of the vehicle.

According to various exemplary embodiments of the present disclosure, the method may further include checking an inaudible preset frequency related to a moving path of a vehicle from the preset list, and changing the inaudible preset frequency to a predetermined radio frequency, wherein the predetermined radio frequency may include audible radio frequencies of other radio broadcasts on the moving path.

According to various exemplary embodiments of the present disclosure, the method may further include outputting the preset list, and outputting the inaudible preset frequency in a first scheme and output other preset frequencies excluding the inaudible preset frequency in a second scheme in the preset list output to the display.

According to various exemplary embodiments of the present disclosure, the method may further include changing the inaudible preset frequency selected through an input device to the predetermined radio frequency.

The methods and apparatuses of the present disclosure have other features and advantages which will be apparent from or are set forth in more detail in the accompanying drawings, which are incorporated herein, and the following Detailed Description, which together serve to explain predetermined principles of the present disclosure.

BRIEF DESCRIPTION OF THE DRAWINGS

FIG. 4 is a diagram illustrating a preset list according to various embodiments:

With regard to description of drawings, the same or similar elements may be marked by the same or similar reference numerals.

Figure 1A:
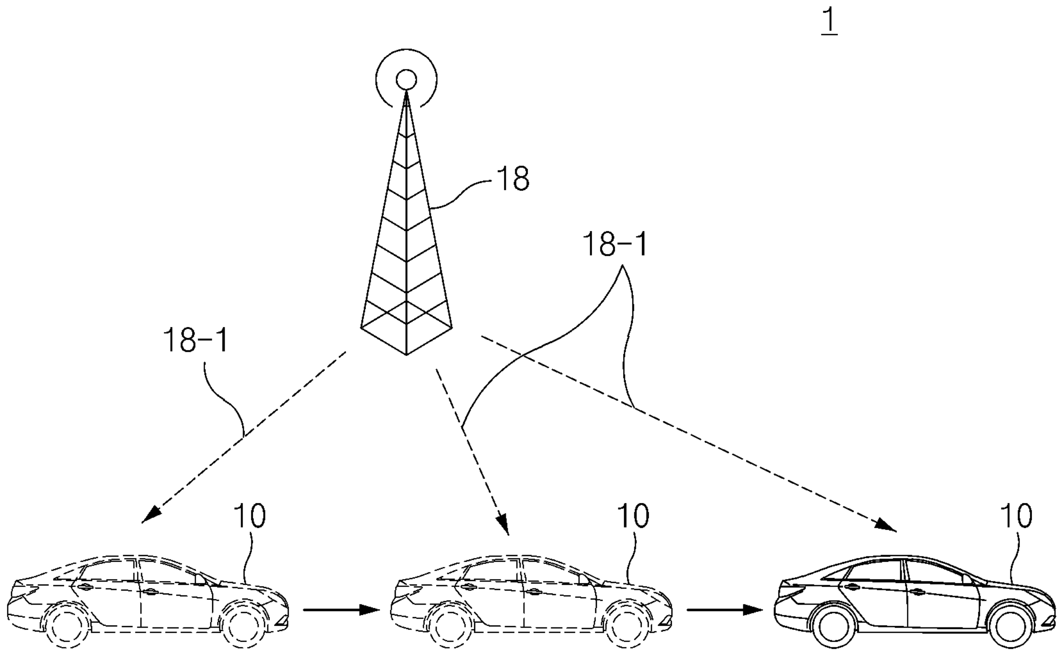
FIG. 1A is a diagram illustrating a vehicle system according to various embodiments.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein include the same meaning as commonly understood by one of ordinary skill in the art to which the present disclosure belongs. It will be further understood that terms, such as those defined in commonly used dictionaries, should be interpreted as including a meaning which is consistent with their meaning in the context of the relevant art and will not be interpreted in an idealized or overly formal sense unless so defined herein.

A vehicle referred to in the following description may include a vehicle driven by the boarding and/or manipulation of a driver and an autonomous vehicle including a self-driving function without a manipulation of a driver. Furthermore, in the following description, a vehicle is referred to as an example of a vehicle, but the exemplary embodiments are not limited thereto. For example, various embodiments below may be applied to various transportation vehicles such as ships, air lines, trains, motorcycles, bicycles, or the like.

Hereinafter, various embodiments of the present disclosure will be described in detail with reference to FIGS. 1A to 10.

FIG. 1A is a diagram illustrating a vehicle system according to various embodiments.

Referring to FIG. 1A, a vehicle system 1 according to various embodiments of the present disclosure may include a vehicle 10 and a transmission station 18. However, this is only exemplary, and various exemplary embodiments of the present disclosure are not limited thereto. For example, one or more other components may be added to the configuration of the vehicle system 1.

According to various exemplary embodiments of the present disclosure, the vehicle 10 may be driven by power generated by a driving device (e.g., an engine, a motor, or the like). According to an exemplary embodiment of the present disclosure, the vehicle 10 may be an eco-friendly vehicle using power energy stored in a battery module as a power source, but various embodiments below are not limited thereto.

According to various exemplary embodiments of the present disclosure, the vehicle 10 may select a radio frequency corresponding to a radio broadcast (e.g., a radio program) and receive the broadcast signal of the selected radio frequency. According to an exemplary embodiment of the present disclosure, a broadcast signal corresponding to a radio broadcast receivable in a traveling area and/or a radio broadcast (e.g., a radio frequency) selected by an occupant (e.g., a driver and a passenger) may be received.

For example, when a radio frequency (e.g., 88.1 MHz) corresponding to a radio broadcast (e.g., radio program for traffic broadcasting) that the occupant desires to listen to is selected, as shown, the vehicle 10 may receive a broadcast signal 18-1 transmitted from the transmission station 18 through the selected radio frequency. Furthermore, the vehicle 10 may output a sound signal corresponding to the received broadcast signal 18-1 through a speaker. Thus, while the vehicle 10 travels and/or is stopped, the occupant may listen to the selected radio broadcast. Regarding the selection of the above-described radio frequency, it will be described in more detail through the following embodiments.

Figure 1B:
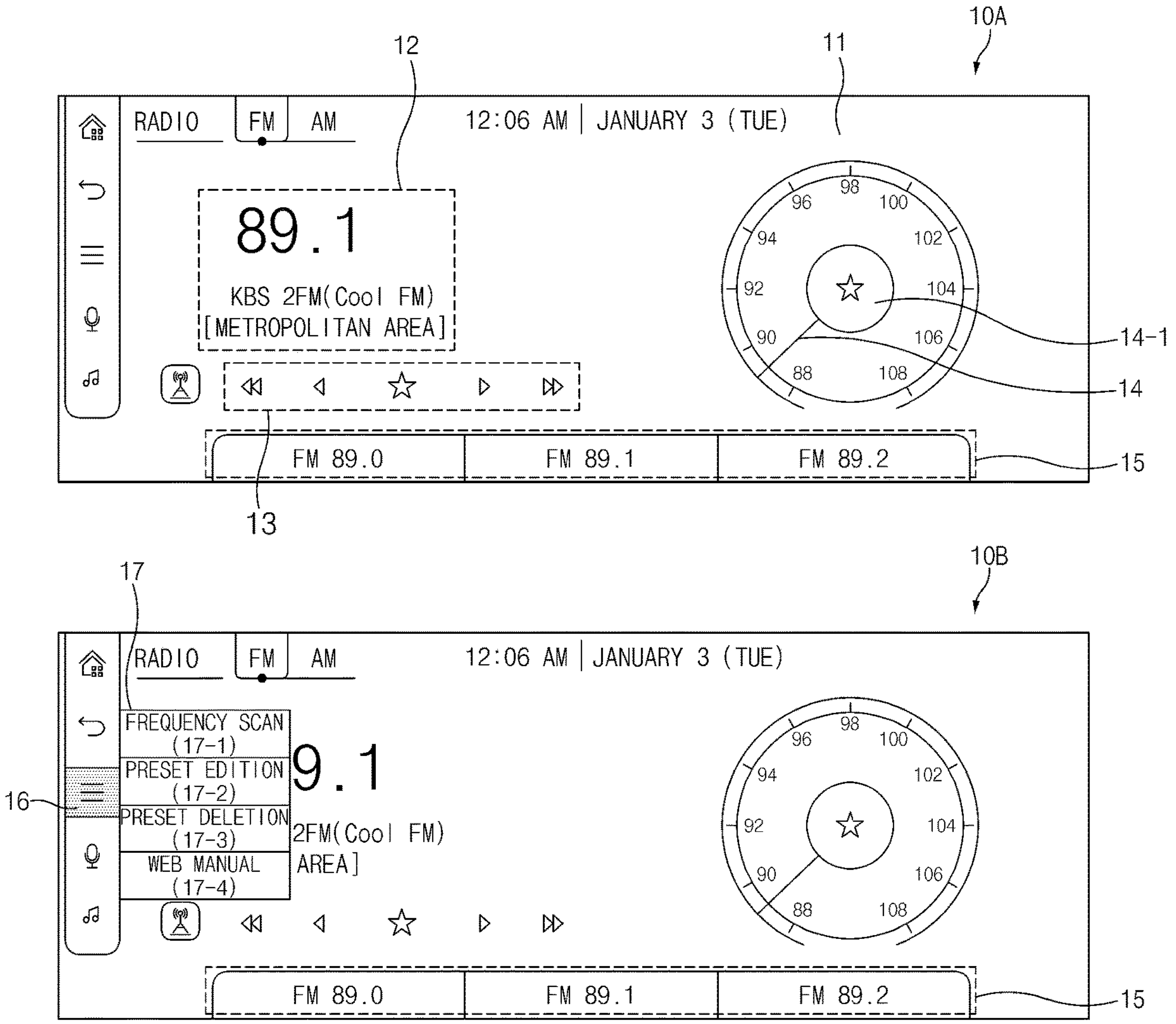
FIG. 1B is a diagram illustrating an operation of selecting a radio frequency according to various embodiments.

FIG. 1B is a diagram illustrating an operation of selecting a radio frequency according to various embodiments.

Referring to FIG. 1B, the vehicle 10 according to various embodiments of the present disclosure may provide a user interface 11 for selecting (and/or changing) a radio frequency. For example, the user interface 11 may be output through a display (e.g., a head-up display, a touch screen, a cluster, or the like) of the vehicle 10.

According to an exemplary embodiment of the present disclosure, the user interface 11 may include information (e.g., radio broadcast name, frequency information, or the like) 12 related to a currently selected radio broadcast (e.g., a radio broadcast being listened to), a search menu 13 for searching for a radio frequency in a first direction (e.g., a high frequency direction) and/or a second direction (e.g., a low frequency direction), and a frequency bar 14 indicating a range of receivable radio frequencies and a radio frequency currently being listened to. In this regard, the occupant may select (or change) a radio frequency to be listened to while changing (e.g., decreasing or increasing) the radio frequency at a specified interval (e.g., 0.2 MHz) according to an input (e.g., touch input) to the user interface 11 (e.g., the search menu 13).

The configuration of the above-described user interface 11 is an example, and various exemplary embodiments of the present disclosure are not limited thereto. For example, the user interface 11 may further include other components in addition to the aforementioned components. Furthermore, the input for selecting a radio frequency may include various types of inputs such as a voice input, an input to an input device (e.g., a jog dial, a physical button, or the like), or the like.

According to various exemplary embodiments of the present disclosure, as shown in 10A of FIG. 1B, the vehicle 10 may select a radio frequency based on an input detected through the user interface 11 and receive a broadcast signal of the selected radio frequency.

According to an exemplary embodiment of the present disclosure, the vehicle 10 may select a radio frequency corresponding to an attribute of an input to the user interface 11 (e.g., the search menu 13). The attribute may include an input strength (e.g., pressure), a holding time of the input, an area (e.g., a touch area) of the input, or a combination of at least two thereof. For example, the vehicle 10 may change the radio frequency based on a specified interval (e.g., 0.2 MHz) when an input corresponding to a first attribute (e.g., a sustained touch or an intermittent touch input for a first time) is detected. Furthermore, when the vehicle 10 detects an input corresponding to a second attribute different from the first attribute (e.g., sustained touch or continuous touch input for a second time longer than the first time), the radio frequency may be changed based on an interval (e.g., 1 MHz) greater than the specified interval.

Additionally or alternatively, as shown in 10B of FIG. 1B, the vehicle 10 may automatically select a radio frequency with good reception while scanning radio frequencies. For example, the vehicle 10 may automatically select a radio frequency with good reception while changing (e.g., decreasing or increasing) the radio frequency at a specified interval.

According to an exemplary embodiment of the present disclosure, the vehicle 10 may receive a broadcast signal while scanning based on the lowest radio frequency among receivable radio frequencies. Of course, in various exemplary embodiments of the present disclosure, it is also possible to receive a broadcast signal while scanning based on the highest radio frequency or the middle radio frequency among receivable radio frequencies.

According to an exemplary embodiment of the present disclosure, selection of a radio frequency having good reception may be performed based on a specified input. According to an exemplary embodiment of the present disclosure, the vehicle 10 may scan for radio frequencies with good reception based on a specified input 16 to the user interface 11. For example, the specified input 16 may be associated with the call of a menu 17 related to a search for radio frequencies. For example, a first menu (e.g., frequency scan) 17-1 for receiving a broadcast signal with good reception based on the specified input 16 may be called, and the vehicle 10 may perform an operation of automatically selecting a radio frequency with good reception based on an additional input detected for the first menu 17-1. However, this is only exemplary, and various exemplary embodiments of the present disclosure are not limited thereto. For example, the vehicle 10 may automatically select a radio frequency having good reception regardless of the call of the menu 17 related to radio frequency search.

According to various exemplary embodiments of the present disclosure, the vehicle 10 may provide a preset function of storing (e.g., registering) radio frequencies in advance. Accordingly, an occupant may store a radio frequency to be listened to as a preset frequency, and may conveniently and rapidly listen to a radio broadcast by use of the stored preset frequency.

According to an exemplary embodiment of the present disclosure, the preset function may include a first mode preset function in which a passenger directly selects and stores a desired radio frequency and a second mode preset function in which the vehicle 10 automatically selects and stores a radio frequency with good reception while scanning radio frequencies. The preset function of the first mode may be defined as a manual storage mode in that the occupant directly selects a radio frequency, and the preset function of the second mode may be defined as an automatic storage mode in that the vehicle 10 automatically selects a radio frequency.

According to an exemplary embodiment of the present disclosure, the vehicle 10 may perform the first mode preset function of storing a radio frequency selected by the scheme described with reference to 10A of FIG. 1B as a preset frequency. Furthermore, the vehicle 10 may perform the second mode preset function of storing a radio frequency with good reception selected by the scheme described with reference to 10B of FIG. 1B as a preset frequency.

According to various exemplary embodiments of the present disclosure, the vehicle 10 may additionally provide the user interface 11 related to the preset function.

According to an exemplary embodiment of the present disclosure, as shown in 10A of FIG. 1B, the user interface 11 related to the preset function may include a preset storage menu 14-1 for storing a selected radio frequency 12 as a preset frequency and a preset list 15 displaying stored preset frequencies. Accordingly, the vehicle 10 may store the radio frequency 12 displayed on the user interface 11 as a preset frequency based on the input detected in the preset storage menu 14-1. For example, the selected radio frequency 12 may be registered (e.g., added) in the preset list 15.

Additionally or alternatively, as shown in 10B of FIG. 1B, a menu related to performing a preset function may be additionally provided to the user interface 11. For example, at least one of a second menu (e.g., edit preset) 17-2 for changing radio frequencies registered in the preset list 15 in a desired order, a third menu (e.g., delete preset) 17-3 for deleting radio frequencies registered in the preset list 15, or a fourth menu (e.g., a web manual) 17-4 for providing a manual for a preset function may be provided to the user interface 11.

However, when the number (e.g., 6) of preset frequencies which may be stored in the vehicle 10 is limited, it is difficult to store a relatively high radio frequency (or a relatively low radio frequency) as a preset frequency by executing the second mode preset function.

In other words, when the vehicle 10 performs scanning based on the lowest radio frequency (e.g., 80.1 MHz displayed on the frequency bar 14) of receivable radio frequencies by executing the second mode preset function, a relatively low radio frequency (e.g., a radio frequency in the range of about 80.1 MHz to 98.1 MHZ) may be stored as a preset frequency and a relatively high radio frequency may not be stored even though the receiving state of the broadcast signal of the relatively high radio frequency is good.

To the contrary, when the vehicle 10 performs scanning based on the highest radio frequency (e.g., 108.1 MHz displayed on the frequency bar 14) of receivable radio frequencies by executing the second mode preset function, a relatively high radio frequency (e.g., a radio frequency in the range of about 99.1 MHz to 108.1 MHZ) may be stored as a preset frequency and a relatively low radio frequency may not be stored even though the receiving state of the broadcast signal of the relatively low radio frequency is good.

In this regard, various embodiments prevent radio frequencies of the same radio broadcast from being registered in the preset list 15 in duplicate, so that it is possible to store relatively high radio frequencies as well as relatively low radio frequencies among receivable radio frequencies in the preset list 15. As described above, the configuration of excluding the radio frequency of the same radio broadcast from the preset list 15 will be described in detail with the following embodiments.

Figure 1C:
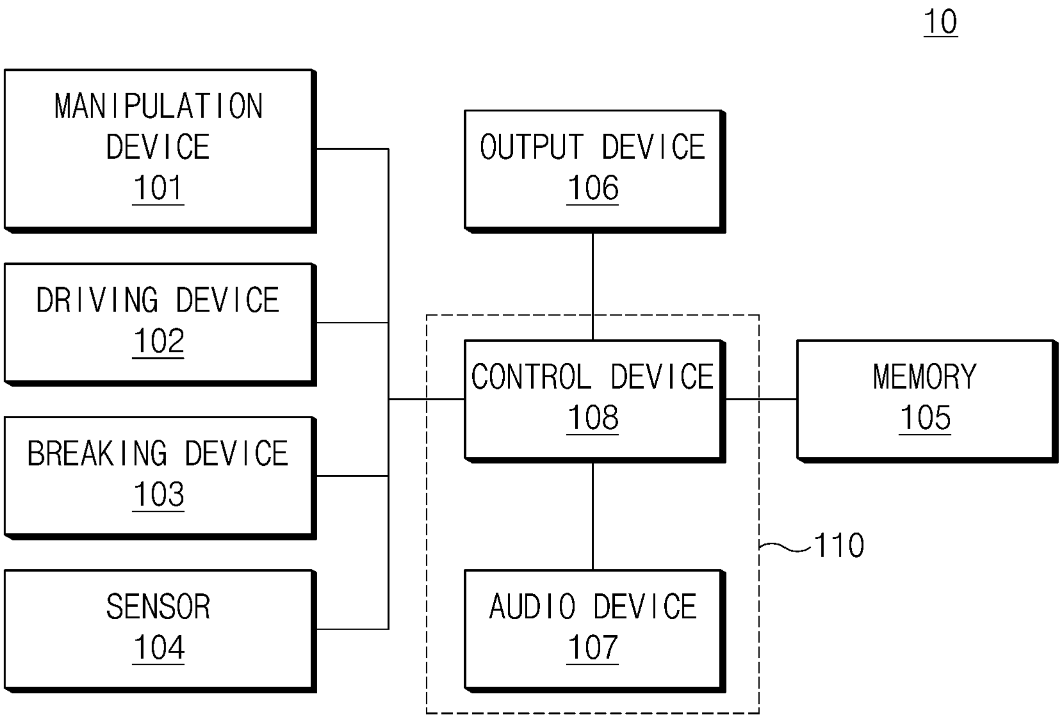
FIG. 1C is a diagram illustrating a vehicle according to various embodiments.
Figure 1D:
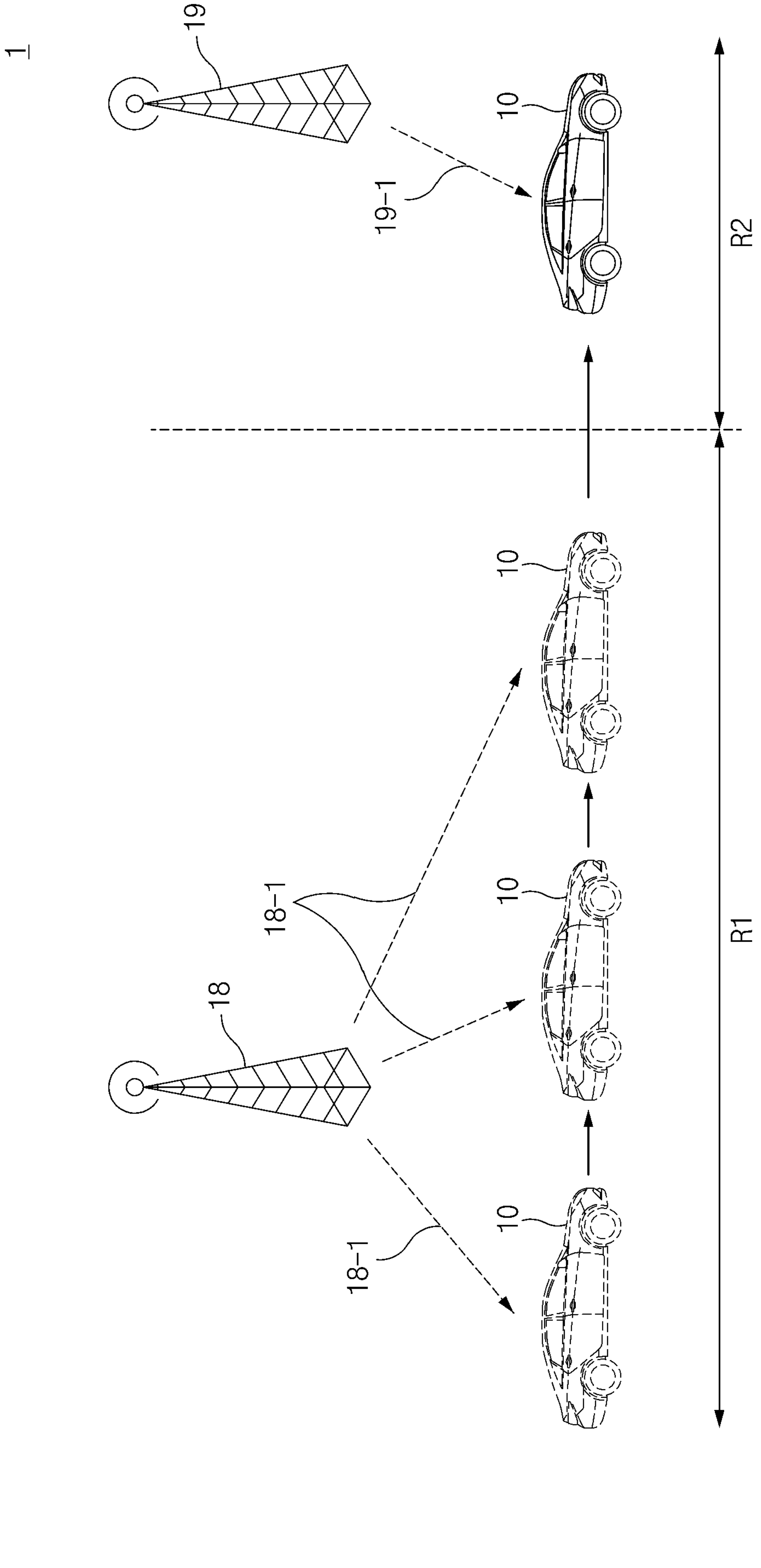
FIG. 1D is a diagram illustrating an operation of changing a preset frequency according to various embodiments.

FIG. 1C is a diagram illustrating a vehicle according to various embodiments. FIG. 1D is a diagram illustrating an operation of changing a preset frequency according to various embodiments.

Referring to FIG. 1C, the vehicle 10 according to various embodiments of the present disclosure may include a manipulation device 101, a driving device 102, a braking device 103, a sensor 104, a memory 105, an output device 106, an audio device 107, and a control device 108.

However, this is only exemplary, and various exemplary embodiments of the present disclosure are not limited thereto. For example, at least one of the aforementioned components of the vehicle 10 may be omitted or one or more other components may be added to the configuration of the vehicle 10. Furthermore, at least one of the components of the vehicle 10 described above may be integrated with other components.

According to various exemplary embodiments of the present disclosure, the manipulation device 101 may receive a user (e.g., an occupant) input for driving. According to an exemplary embodiment of the present disclosure, the manipulation device 101 may include a steering input device (e.g., a steering wheel), an acceleration input device (e.g., an accelerator pedal), and a brake input device (e.g., a brake pedal). Additionally or alternatively, the manipulation device 101 may include at least one input device (e.g., a jog dial, a physical button, or the like) for controlling execution of radio broadcast.

However, this is only exemplary, and the present disclosure is not limited thereto. For example, various input devices for manipulating a seat heating wire, internal lights, navigation, direction indicators, tail lamps, head lamps, a wiper, and an air conditioner provided in the vehicle 10 may also be configured as at least a portion of the manipulation device 101.

According to various exemplary embodiments of the present disclosure, the driving device 102 may be configured to generate a power source related to driving of the vehicle 10. According to an exemplary embodiment of the present disclosure, the driving device 102 may include an engine and/or a motor.

For example, power generated by the driving device 102 may be transmitted to an axle via a transmission and a differential gear device. Accordingly, the driving wheels may be rotated by the axle, so that the vehicle 10 travels. A transmission, a differential gear device, an axle, and a driving wheel are well known in the art through many documents, and the details will be omitted throughout the present disclosure.

According to various exemplary embodiments of the present disclosure, the braking device 103 may be configured for controlling a brake apparatus in the vehicle 10. According to an exemplary embodiment of the present disclosure, the braking device 103 may be configured for controlling the operation of each brake arranged on a plurality of driving wheels to control the speed of the vehicle 10 (e.g., control deceleration).

According to various exemplary embodiments of the present disclosure, the sensor 104 may detect a state of the vehicle 10 and generate an electrical signal or data value corresponding to the detected state. According to an exemplary embodiment of the present disclosure, the sensor 104 may include at least one sensor configured to collect (or detect) information related to the driving state of vehicle 10. The information related to the driving state of the vehicle 10 may include at least one of a driving speed, a current weight, a braking state, a steering state, an acceleration state, or a deceleration state of the vehicle 10.

However, this is only exemplary, and various exemplary embodiments of the present disclosure are not limited thereto. For example, the sensor 104 may include various types of sensors (e.g., a radio detection and ranging (RADAR), a Light Detection and Ranging (LiDAR), a camera, an ultrasonic sensor, a laser scanner, or the like) configured for detecting an obstacle located around the vehicle 10 and obtaining information related to the distance and/or relative speed of the obstacle, and the type of the obstacle (e.g., another vehicle, a pedestrian, a bicycle, a motorcycle, or the like). Furthermore, various sensors (e.g., a camera, a temperature sensor, or the like) configured to detect conditions (e.g., occupants) inside the vehicle 10 may be provided as components of the sensor 104.

According to various exemplary embodiments of the present disclosure, the memory 105 may include data related to at least one other component of the vehicle 10 and programs, algorithms, routines, and/or instructions related to the operation (or control) of the vehicle 10.

For example, the memory 105 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

According to various exemplary embodiments of the present disclosure, the output device 106 may output information related to the operation of the vehicle 10. According to an exemplary embodiment of the present disclosure, the output device 106 may include an audio output device (e.g., a speaker) configured to output auditory information. Additionally, the output device 106 may include a display (e.g., a heads-up display, a touch screen, a cluster, or the like) configured to output visual information, a haptic module (e.g., a motor, a piezoelectric element, an electrical stimulation device, or the like) configured to output tactile information, and the like.

According to various exemplary embodiments of the present disclosure, the audio device 107 may support a function of reproducing a sound source stored in the vehicle 10 (e.g., the memory 105) or another storage medium (e.g., a compact disc).

Additionally or alternatively, the audio device 107 may receive a broadcast signal from an air wave. For example, the audio device 107 may search for a radio frequency corresponding to a radio broadcast (e.g., a radio program) and receive a broadcast signal of the detected radio frequency. The details related to the audio device 107 will be described with reference to FIG. 2 below.

According to various exemplary embodiments of the present disclosure, the control device 108 may be electrically connected to the manipulation device 101, the driving device 102, the braking device 103, the sensor 104, the memory 105, the output device 106, and the audio device 107, and may be configured for controlling the overall operation of the vehicle 10. For example, the control device 108 may be an electronic control unit (ECU), a micro controller unit (MCU), or other lower level controller provided in the vehicle 10.

According to various exemplary embodiments of the present disclosure, the vehicle 10 may include a radio system 110 that is configured to control an output of a radio broadcast. For example, the radio system 110 may include the audio device 107 and the control device 108. This is only exemplary, and other components (e.g., the output device 106) of the vehicle 10 may be further added as a configuration of the radio system 110.

The description below relates to various embodiments of the radio system 110.

According to various exemplary embodiments of the present disclosure, the control device 108 may be configured for controlling the output of radio broadcast. For example, as described above with reference to FIG. 1B, the control device 108 may receive a broadcast signal based on an input detected through the user interface 11 and control the execution of the preset function of storing at least one radio frequency in advance.

According to various exemplary embodiments of the present disclosure, in connection with the execution of the preset function, the control device 108 may prevent radio frequencies of the same radio broadcast from being registered in duplicate in the preset list 15. In other words, the control device 108 may exclude radio frequencies of the same radio broadcast from the preset list 15.

The following description relates to various embodiments of the control device 108 for preventing radio frequencies of the same radio broadcast from being registered in duplicate in the preset list 15 in a situation in which the second mode preset function is executed. Of course, the control device 108 according to various embodiments of the present disclosure may prevent radio frequencies of the same radio broadcast from being registered in duplicate in the preset list 15 even in a situation in which the first mode preset function is executed. Accordingly, at least some of the following various embodiments may be executed together with the first mode preset function.

According to various exemplary embodiments of the present disclosure, the control device 108 may execute the second mode preset function of automatically selecting a radio frequency having good reception and storing it as a preset frequency while scanning radio frequencies.

According to an exemplary embodiment of the present disclosure, the control device 108 may receive the first broadcast signal for a specified time (e.g., 5 seconds) through a first radio frequency (e.g., 80.1 MHZ). The first radio frequency may be the lowest radio frequency (or, highest frequency or intermediate frequency) among radio frequencies receivable by the audio device 107. Furthermore, the control device 108 may store the first radio frequency as a first preset frequency when the reception sensitivity of the first broadcast signal is equal to or greater than the reference sensitivity, and may not store the first radio frequency as a preset frequency when the reception sensitivity of the first broadcast signal is less than the reference sensitivity. For example, the reception sensitivity may be related to the quality of a broadcast signal being received through the audio device 107, such as a received signal strength indication, a signal to noise ratio, and the like. According to an exemplary embodiment of the present disclosure, when the first radio frequency is stored as a preset frequency, the control device 108 may output the first radio frequency to the preset list 15.

According to various exemplary embodiments of the present disclosure, the control device 108 may receive a broadcast signal of another radio frequency while changing a first radio frequency (e.g., 80.1 MHz) at a specified interval (e.g., 0.2 MHz). According to an exemplary embodiment of the present disclosure, the control device 108 may select a second radio frequency (e.g., 82.1 MHz) corresponding to a second broadcast signal having a reception sensitivity equal to or greater than the reference sensitivity while changing at a specified interval.

According to various exemplary embodiments of the present disclosure, when the second radio frequency is selected, the control device 108 may output the selected second radio frequency to the preset list 15. According to an exemplary embodiment of the present disclosure, the control device 108 may update the preset list 15 including the first radio frequency to the preset list 15 including the first radio frequency and the second radio frequency.

According to various exemplary embodiments of the present disclosure, before outputting the second radio frequency to the preset list 15 or after outputting the second radio frequency to the preset list 15, the control device 108 may be configured to determine whether the first broadcast signal received through the first radio frequency and the second broadcast signal received through the second radio frequency are broadcast signals of the same radio broadcast (e.g., radio program). For example, the control device 108 may be configured to determine whether the first broadcast signal and the second broadcast signal are received through different radio frequencies but are broadcast signals of the same radio broadcast.

According to an exemplary embodiment of the present disclosure, the control device 108 may obtain identification information (e.g., a program identifier, program service name, or the like) related to the first broadcast signal and identification information related to the second broadcast signal from inside (e.g., memory 105) or outside (e.g., the transmission station 18, server device, or the like) of vehicle 10, and determine whether both the broadcast signals are broadcast signals of the same radio broadcast based on the obtained identification information.

According to an exemplary embodiment of the present disclosure, when the first broadcast signal and the second broadcast signal are identified as broadcast signals of different radio broadcasts, the control device 108 may store the second radio frequency together with the first radio frequency as preset frequencies. In other words, a second preset frequency corresponding to the second radio frequency may be added to the preset list 15 including the first preset frequency.

Furthermore, when the first broadcast signal and the second broadcast signal are identified as broadcast signals of the same radio broadcast, the control device 108 may select one of the first radio frequency and the second radio frequency as a target frequency, and store the target frequency as a preset frequency. In other words, the preset list 15 including only the first preset frequency may be maintained, or the first preset frequency included in the preset list 15 may be replaced with the second preset frequency.

According to an exemplary embodiment of the present disclosure, the control device 108 may utilize location information related to driving of the vehicle 10 to select a target frequency. The control device 108 may obtain the current location of the vehicle 10 according to a signal received through a communication module (e.g., a global navigation satellite system (GNSS) communication module, or the like), and obtain it as the location information related to driving of the vehicle 10. According to an exemplary embodiment of the present disclosure, the control device 108 may select a target frequency based on the location of a broadcasting station transmitting the first broadcast signal, the location of a broadcasting station transmitting the second broadcast signal, and the current location of the vehicle 10. For example, a radio frequency associated with a broadcasting station located relatively close to the current location of the vehicle 10 may be selected as the target frequency. However, this is only exemplary, and various exemplary embodiments of the present disclosure are not limited thereto. For example, in selecting a target frequency, destination information (e.g., location) input through a navigation system and/or waypoint information (e.g., location) determined by the current location and the destination information may be considered.

According to various exemplary embodiments of the present disclosure, the control device 108 may select a third radio frequency corresponding to a third broadcast signal having a reception sensitivity equal to or greater than a reference sensitivity while changing the radio frequency until a preset number (e.g., 6) of preset frequencies is stored. Of course, the control device 108 may be configured to determine whether the broadcast signal of the radio frequency included in the preset list 15 and the third broadcast signal are broadcast signals of the same radio broadcast, and may store the third radio frequency as a third preset frequency when it is determined that the broadcast signals are different from each other.

As described above, various embodiments may enable storage of preset frequencies for different radio broadcasts by excluding radio frequencies of the same duplicated radio broadcast from the preset list 15.

However, when the vehicle 10 moves from a first area to a second area, radio frequencies receivable in a first area 151 and radio frequencies receivable in the second area may be different from each other. In other words, as shown in FIG. 1D, in a first area R1, broadcast signals 18-1 of the preset frequencies included in the preset list 15 may be received through the first transmission station 18, but in a second area R2, only broadcast signals 19-1 for some preset frequencies included in the preset list 15 may be received through a second transmission station 19, and broadcast signals of at least one other preset frequency may not be received.

In this regard, the control device 108 according to various embodiments of the present disclosure may change at least one preset frequency included in the preset list 15 to an alternative frequency while the movement (e.g., driving) of the vehicle 10 is detected. The alternative frequency may be another frequency (e.g., a radio frequency in another area) that transmits the same radio broadcast as the radio broadcast which may be received through the preset frequency.

According to an exemplary embodiment of the present disclosure, the control device 108 may check the reception sensitivity for each preset frequency included in the preset list 15. For example, the control device 108 may check a preset frequency having a reception sensitivity less than the reference sensitivity in the preset list 15.

In this regard, as described later with reference to FIG. 2, the radio system 110 (e.g., the audio device 107) may include a plurality of tuners (e.g., a main tuner 203 and a sub tuner 204). In the instant case, the control device 108 may measure the reception sensitivity of a broadcast signal corresponding to each preset frequency received through one tuner (e.g., the sub tuner 204) while receiving a broadcast signal received through another tuner (e.g., the main tuner 203). Furthermore, the control device 108 may obtain an alternative frequency for transmitting the same radio broadcast as the radio broadcast of the preset frequency having a reception sensitivity less than the reference sensitivity from the inside (e.g., the memory 105) or the outside (e.g., the transmission station 18, a server device, or the like) of the vehicle 10. Accordingly, an occupant may continuously listen to the radio broadcast registered with the preset frequency even when moving through an area through driving.

Figure 2:
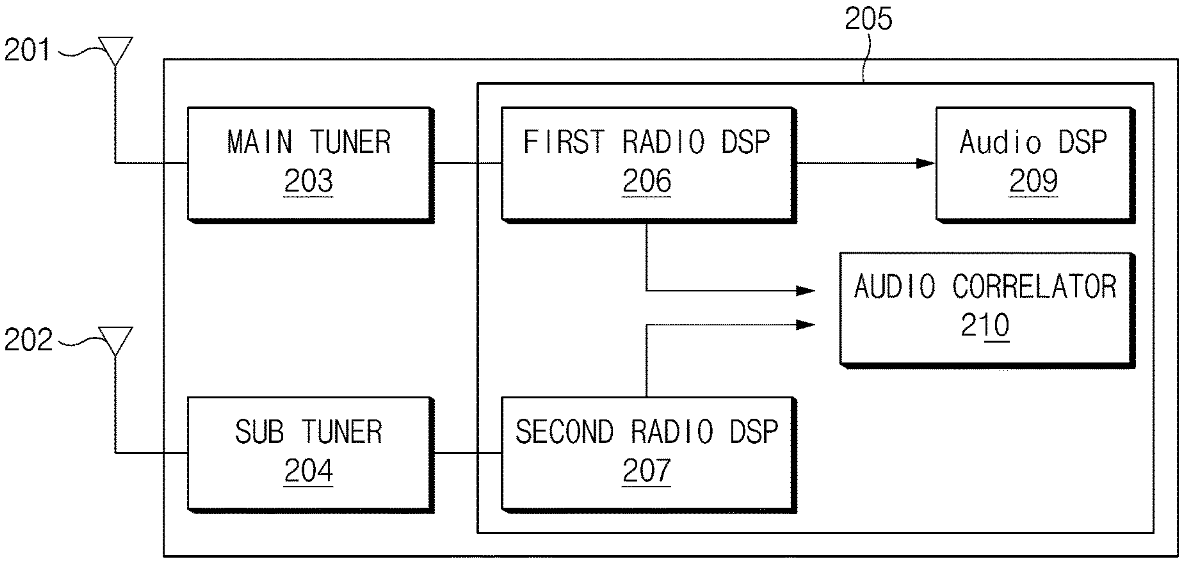
FIG. 2 is a diagram schematically illustrating a configuration of an audio device according to various embodiments.

FIG. 2 is a diagram schematically illustrating a configuration of an audio device according to various embodiments.

Referring to FIG. 2, the audio device 107 may include a first antenna 201, a second antenna 202, the main tuner 203 electrically connected to the first antenna 201, the sub tuner 204 electrically connected to the second antenna 202, and/or a signal processor 205.

According to various exemplary embodiments of the present disclosure, the first antenna 201 and the second antenna 202 may receive signals transmitted from a transmission station of each radio broadcast company.

According to various exemplary embodiments of the present disclosure, the main tuner 203 may receive a signal of a radio frequency corresponding to a selected radio broadcast (e.g., a radio program), and the sub tuner 204 may receive a signal of at least one radio frequency settable in the audio device 107.

According to an exemplary embodiment of the present disclosure, the sub tuner 204 may identify at least one radio frequency settable in the audio device 107, that is, an effective radio frequency, based on the electric field strength of signals of all frequencies received through the second antenna 202. For example, the sub tuner 204 may identify a radio frequency of a signal including an electric field strength greater than a specified reference electric field strength as an effective radio frequency.

According to various exemplary embodiments of the present disclosure, the signal processor 205 may be configured to process signals transmitted from the main tuner 203 and/or the sub tuner 204 and transmit signal processing information to the control device 108. According to an exemplary embodiment of the present disclosure, the signal processor 205 may output a sound signal corresponding to the radio frequency signal received from the main tuner 203 through the output device 106 based on the control of the control device 108.

According to various exemplary embodiments of the present disclosure, the signal processor 205 may include a first radio digital signal processor (DSP) 206 electrically connected to the main tuner 203, a second radio DSP 207 electrically connected to the sub tuner 204, an audio correlator 210, and/or an audio DSP 209.

According to various exemplary embodiments of the present disclosure, the first radio DSP 206 may be configured to process the signal received from the main tuner 203 and transmit the signal to the audio correlator 210 and/or the audio DSP 209, and may the second radio DSP 207 may be configured to process the signal received from the sub tuner 204 and transmit the signal to the audio correlator 210.

According to various exemplary embodiments of the present disclosure, the audio correlator 210 may be configured to determine a correlation between the signal transmitted from the first radio DSP 209 and the signal transmitted from the second radio DSP 207, and transmit the correlation information to the control device 108. For example, the correlation information may be used for radio frequency change.

According to various exemplary embodiments of the present disclosure, the audio DSP 209 may be configured to process the signal transmitted from the first radio DSP 206 and transmit the signal to the output device 106 of the vehicle 10.

The components of the audio device 107 described above are only an exemplary embodiment of the present disclosure, and various exemplary embodiments of the present disclosure are not limited thereto. For example, at least one of the components of the audio device 107 described with reference to FIG. 2 may be omitted or one or more other components may be added to the configuration of the audio device 107. For example, the sub tuner 204 may be omitted from the configuration of the audio device 107 and operations executed by the sub tuner 204 may be executed by the main tuner 203.

As described above, the radio system 110 according to various embodiments of the present disclosure may analyze a radio broadcast of a first radio frequency and a radio broadcast of a second radio frequency currently received under a favorable electric field state to determine a first correlation between the two radio broadcasts, and select a second radio frequency in an adjacent to area transmitting the same broadcast as the currently received radio broadcast by use of the first correlation determined in advance when the electric field state is very poor so that it is possible to continuously output the same radio broadcast as the currently received radio broadcast even when the electric field state rapidly deteriorates:

Hereinafter, a method of operating the radio system 110 according to various embodiments will be described with reference to FIGS. 3A to 9.

Figure 3A:
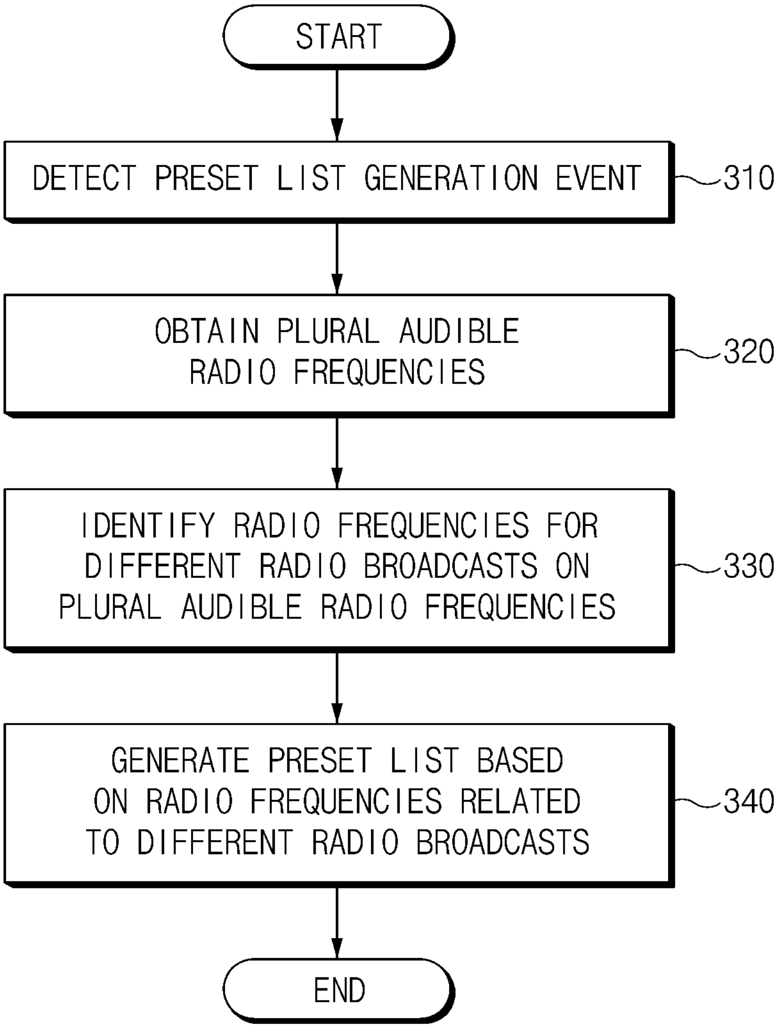
FIG. 3A is a flowchart illustrating the operation of a radio system according to various embodiments.

FIG. 3A is a flowchart illustrating the operation of a radio system according to various embodiments. FIG. 4 is a diagram illustrating a preset list according to various embodiments. In the following embodiment, operations may be performed sequentially, but are not necessarily performed sequentially. For example, the order of each operation may be changed, or at least two operations may be performed in parallel. Furthermore, at least one of the following operations may be omitted according to an exemplary embodiment of the present disclosure.

Referring to FIG. 3A, the radio system 110 (e.g., the control device 108) according to various embodiments of the present disclosure may detect a preset list 15 generation event in operation 310. According to an exemplary embodiment of the present disclosure, the preset list 15 generation event may be associated with the execution of a preset function for pre-storing at least one radio frequency.

According to an exemplary embodiment of the present disclosure, the control device 108 may detect a first event of instructing the execution of the first mode preset function or a second event of instructing the execution of the second mode preset function. According to an exemplary embodiment of the present disclosure, the first event may be an input for the preset storage menu 14-1 of the user interface 11, and the second event may be an input for the first menu (e.g., frequency scan) 17-1 of the user interface 11.

According to various exemplary embodiments of the present disclosure, when the preset list 15 generation event is detected, in operation 320, the radio system 110 (e.g., the control device 108) may obtain a plurality of audible radio frequencies.

According to an exemplary embodiment of the present disclosure, when the first event is detected, the control device 108 may select a plurality of radio frequencies corresponding to an input for the user interface 11 (e.g., the search menu 13). For example, at least one radio frequency may be selected by the method described with reference to 10A of FIG. 1B.

According to an exemplary embodiment of the present disclosure, when the second event is detected, the control device 108 may automatically select a plurality of radio frequencies having reception sensitivities greater than or equal to the reference sensitivity while changing (e.g., decreasing or increasing) the radio frequency at a specified interval (e.g., 0.2 MHZ). For example, at least one radio frequency may be selected by the method described with reference to 10B of FIG. 1B.

According to various exemplary embodiments of the present disclosure, in operation 330, the radio system 110 (e.g., the control device 108) may obtain radio frequencies for different radio broadcasts among a plurality of audible radio frequencies. In this regard, it will be described in more detail along with operation 340 to be described later.

According to various exemplary embodiments of the present disclosure, in operation 340, the radio system 110 (e.g., the control device 108) may be configured to generate the preset list 15 based on radio frequencies for different radio broadcasts. In other words, the control device 108 may exclude duplicated radio frequencies of the same radio broadcast from the preset list 15.

The following description may be a more detailed description of an exemplary embodiment of operations 330 and 340 described above.

According to various exemplary embodiments of the present disclosure, as indicated with reference numeral 420 in FIG. 4, the control device 108 may obtain an audible radio frequency 401 and associate it with a broadcasting station name 405 and/or a location 407 of the broadcasting station. As shown, the plurality of audible radio frequencies 401 may include a first radio frequency 411, a second radio frequency 413, a third radio frequency 415 and a fourth radio frequency 417. According to an exemplary embodiment of the present disclosure, the first radio frequency 411 may be associated with the first broadcast signal transmitted by a first broadcasting station (first radio) located in a first area (area 1), the second radio frequency 413 may be associated with a second broadcast signal transmitted by the first broadcasting station (first radio) located in a second area (area 2), the third radio frequency 415 may be associated with the third broadcast signal transmitted by a second broadcasting station (second radio) located in the first area (area 1), and the fourth radio frequency 417 may be associated with a fourth broadcast signal transmitted by a third broadcasting station (third radio) located in the second area (area 2).

According to an exemplary embodiment of the present disclosure, radio frequencies of different radio broadcasts may include the first radio frequency 411 (or the second radio frequency 413) related to the first broadcasting station (first radio), the third radio frequency 415 related to the second broadcast (second radio), and the fourth radio frequency 417 related to the third broadcasting station (third radio) among the first radio frequency 411 to the fourth radio frequency 417 shown in FIG. 4. Furthermore, radio frequencies for the same radio broadcast may be the first radio frequency 411 and the second radio frequency 413 related to the first broadcasting station (first radio) among the first radio frequency 411 to the fourth radio frequency 417.

In this regard, the control device 108 may obtain identification information related to the first broadcast signal to the fourth broadcast signal from the inside (e.g., the memory 105) or outside (e.g., the transmission station 18, the server device, or the like) of the radio system 110, and obtain radio frequencies for different radio broadcasts from a plurality of audible radio frequencies based on the identification information. For example, the control device 108 may obtain the name of a broadcasting station transmitting each broadcast signal as at least a piece of the identification information. Accordingly, as indicated with reference numeral 430 in FIG. 4, the control device 108 may be configured to generate the preset list 15 including only radio frequencies (e.g., the first radio frequency 411, the third radio frequency 415 and the fourth radio frequency 417) related to broadcast signals transmitted from different broadcasting stations. In other words, the control device 108 may prevent radio frequencies related to broadcast signals transmitted from the same broadcasting station from being displayed in duplicate in the preset list 15. However, this is only exemplary, and various exemplary embodiments of the present disclosure are not limited thereto. For example, the control device 108 may obtain a program identifier, a program service name, and the like as at least a piece of identification information.

Additionally or alternatively, the control device 108 may additionally consider a current location 403 of the vehicle 10 in generating the preset list 15. For example, as indicated with reference numeral 440 in FIG. 4, to generate the preset list 15, the control device 108 may select only radio frequencies (e.g., the first radio frequency 411 and the third radio frequency 415) related to a broadcasting station (e.g., a broadcasting station located in the first area) adjacent to the current location (e.g., the first area) of the vehicle 10 from the radio frequencies (e.g., the first radio frequency 411, the third radio frequency 415 and the fourth radio frequency 417) associated with the broadcast signals transmitted from different broadcasting stations. According to an exemplary embodiment of the present disclosure, as will be described later with reference to FIG. 3B, to generate the preset list 15, the control device 108 may select a radio frequency associated with a broadcasting station located adjacent to the current location of the vehicle 10 from among a plurality of radio frequencies related to broadcast signals transmitted from the same broadcasting station.

Figure 3B:
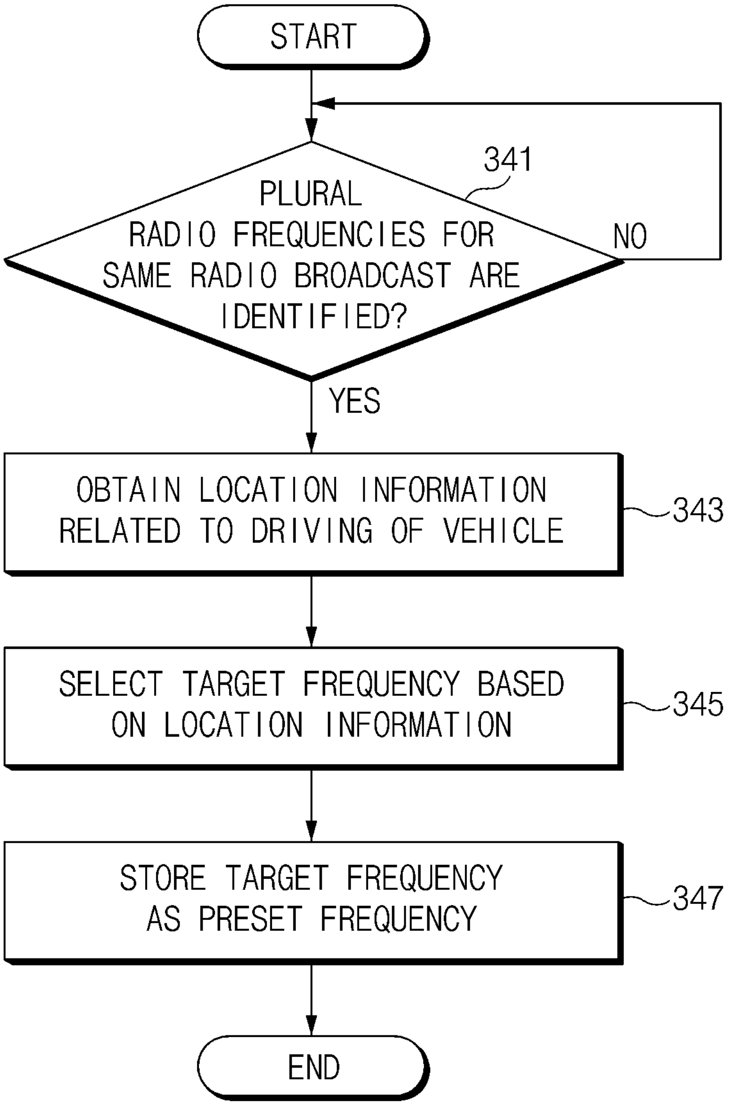
FIG. 3B is a flowchart illustrating an operation of generating a preset list by a radio system according to various embodiments.

FIG. 3B is a flowchart illustrating an operation of generating a preset list by a radio system according to various embodiments. Operations of FIG. 3B described below may represent various examples of operation 340 of FIG. 3A. Furthermore, each operation in the following embodiment may be performed sequentially or the order of each operation may be changed. Furthermore, at least two of the following operations may be performed in parallel.

Referring to FIG. 3B, in operation 341, the radio system 110 (e.g., the control device 108) according to various embodiments of the present disclosure may be configured to determine whether a plurality of radio frequencies for the same radio broadcast are identified in a plurality of audible radio frequencies.

According to various exemplary embodiments of the present disclosure, in operation 343, the radio system 110 (e.g., the control device 108) may obtain location information related to driving of the vehicle 10. According to an exemplary embodiment of the present disclosure, the location information may include the current location of the vehicle 10 obtained based on the signal received through a communication module (e.g., a global navigation satellite system (GNSS) communication module, or the like).

According to various exemplary embodiments of the present disclosure, in operation 345, the radio system 110 (e.g., the control device 108) may select one of a plurality of radio frequencies for the same radio broadcast as a target frequency based on the location information. According to an exemplary embodiment of the present disclosure, the control device 108 may select, as a target frequency, a radio frequency related to a broadcasting station located adjacent to the current location of the vehicle 10 from among a plurality of radio frequencies related to broadcast signals transmitted from the same broadcasting station. According to another exemplary embodiment of the present disclosure, the control device 108 may select, as a target frequency, a radio frequency associated with a broadcasting station located adjacent to a destination of the vehicle 10.

According to various exemplary embodiments of the present disclosure, the radio system 110 (e.g., the control device 108) may store the target frequency as a preset frequency in operation 347. According to an exemplary embodiment of the present disclosure, the control device 108 may store the selected target frequency and radio frequencies for different radio broadcasts as preset frequencies.

Figure 5:
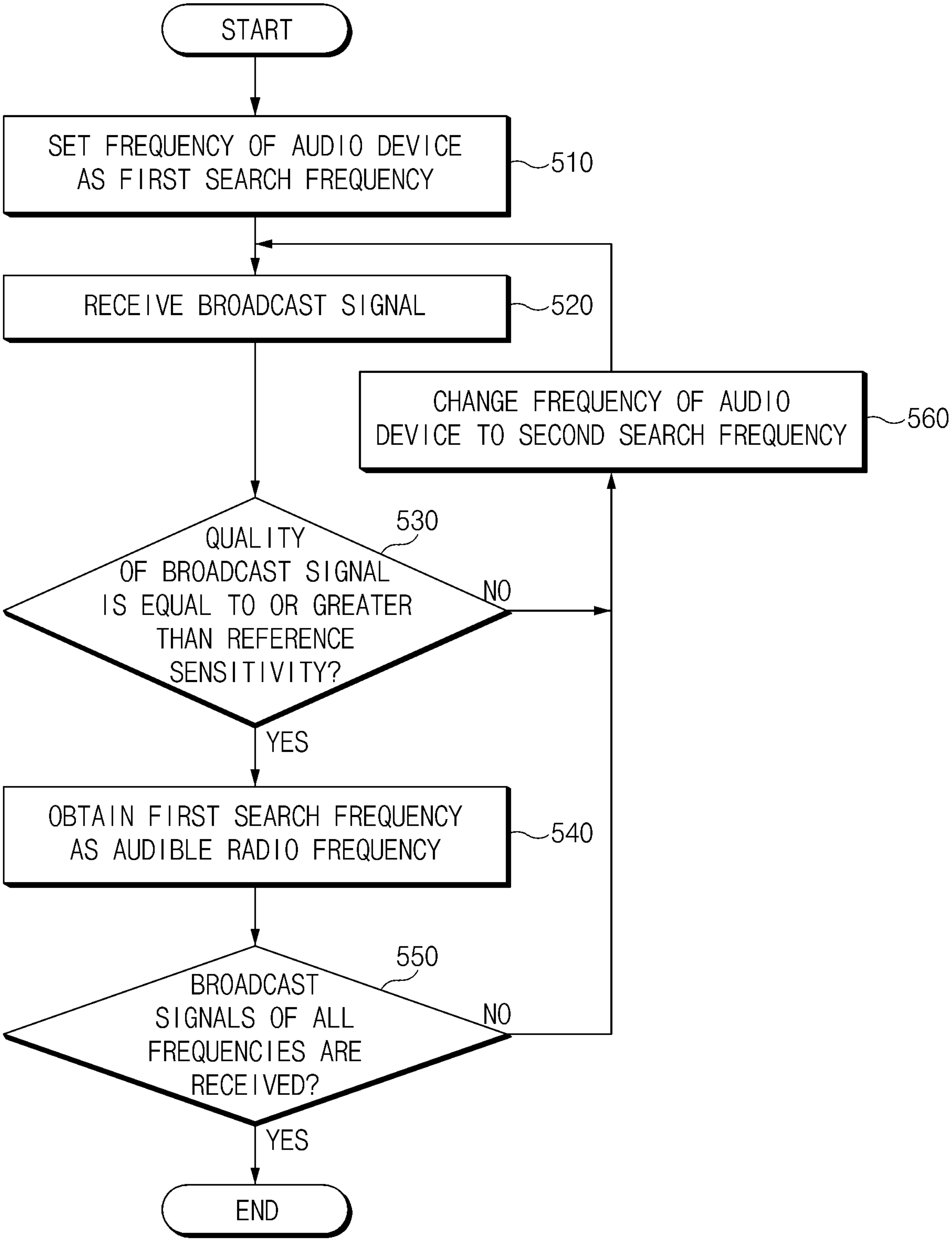
FIG. 5 is a flowchart illustrating a radio frequency selection operation of a radio system according to various embodiments.

FIG. 5 is a flowchart illustrating a radio frequency selection operation of a radio system according to various embodiments. Operations of FIG. 5 described below may represent various examples of operation 320 of FIG. 3A. Furthermore, operations in the following embodiment may be performed sequentially or the order of each operation may be changed. Furthermore, at least two of the following operations may be performed in parallel.

Referring to FIG. 5, in operation 510, the radio system 110 (e.g., the control device 108) according to various embodiments of the present disclosure may set the frequency of the audio device 107 to a first search frequency (e.g., the first radio frequency). According to an exemplary embodiment of the present disclosure, the first search frequency may be the lowest radio frequency among radio frequencies receivable by the audio device 107. However, this is only exemplary, and various exemplary embodiments of the present disclosure are not limited thereto. For example, as described above, the highest radio frequency or the intermediate radio frequency among receivable radio frequencies may be set as the first search frequency.

According to various exemplary embodiments of the present disclosure, in operation 520, the radio system 110 (e.g., the control device 108) may receive a broadcast signal through the first search frequency. According to an exemplary embodiment of the present disclosure, the control device 108 may receive a broadcast signal for a specified time (e.g., 5 seconds) through the first search frequency.

According to various exemplary embodiments of the present disclosure, in operation 530, the radio system 110 (e.g., the control device 108) may be configured to determine whether the reception sensitivity of the broadcast signal received through the first search frequency is greater than or equal to a reference sensitivity. The reception sensitivity may be related to the quality of a broadcast signal being received through the audio device 107, such as a received signal strength indication, a signal to noise ratio, and the like.

According to various exemplary embodiments of the present disclosure, when a broadcast signal having a reception sensitivity less than the reference sensitivity is received, in operation 560, the radio system 110 (e.g., the control device 108) may change the frequency of the audio device 107 to a second search frequency (e.g., the second radio frequency). Furthermore, the control device 108 may be configured to determine whether the reception sensitivity of the broadcast signal received through the second search frequency is greater than or equal to the reference sensitivity.

According to various exemplary embodiments of the present disclosure, when a broadcast signal having a reception sensitivity equal to or greater than the reference sensitivity is received, in operation 540, the radio system 110 (e.g., the control device 108) may obtain the first search frequency as an audible radio frequency.

According to various exemplary embodiments of the present disclosure, after storing the first search frequency as an audible radio frequency, in operation 550, the radio system 110 (e.g., the control device 108) may be configured to determine whether broadcast signals are received through all radio frequencies receivable by the audio device 107.

According to various exemplary embodiments of the present disclosure, when any broadcast signals are not received through all radio frequencies, the radio system 110 (e.g., the control device 108) may repeatedly perform the operation of receiving a broadcast signal while changing the frequency of the audio device 107.

Figure 6:
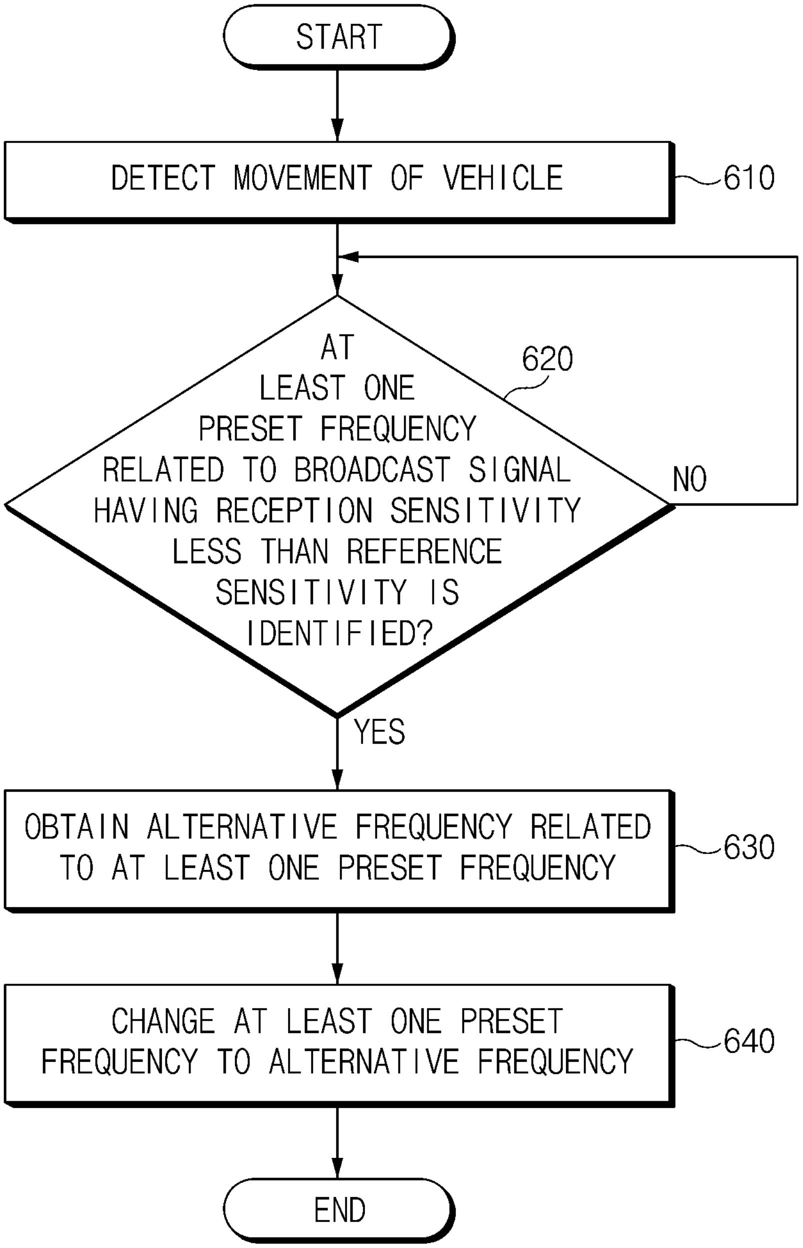
FIG. 6 is a flowchart illustrating an operation of changing a preset frequency to an alternative frequency according to various embodiments.
Figure 7:
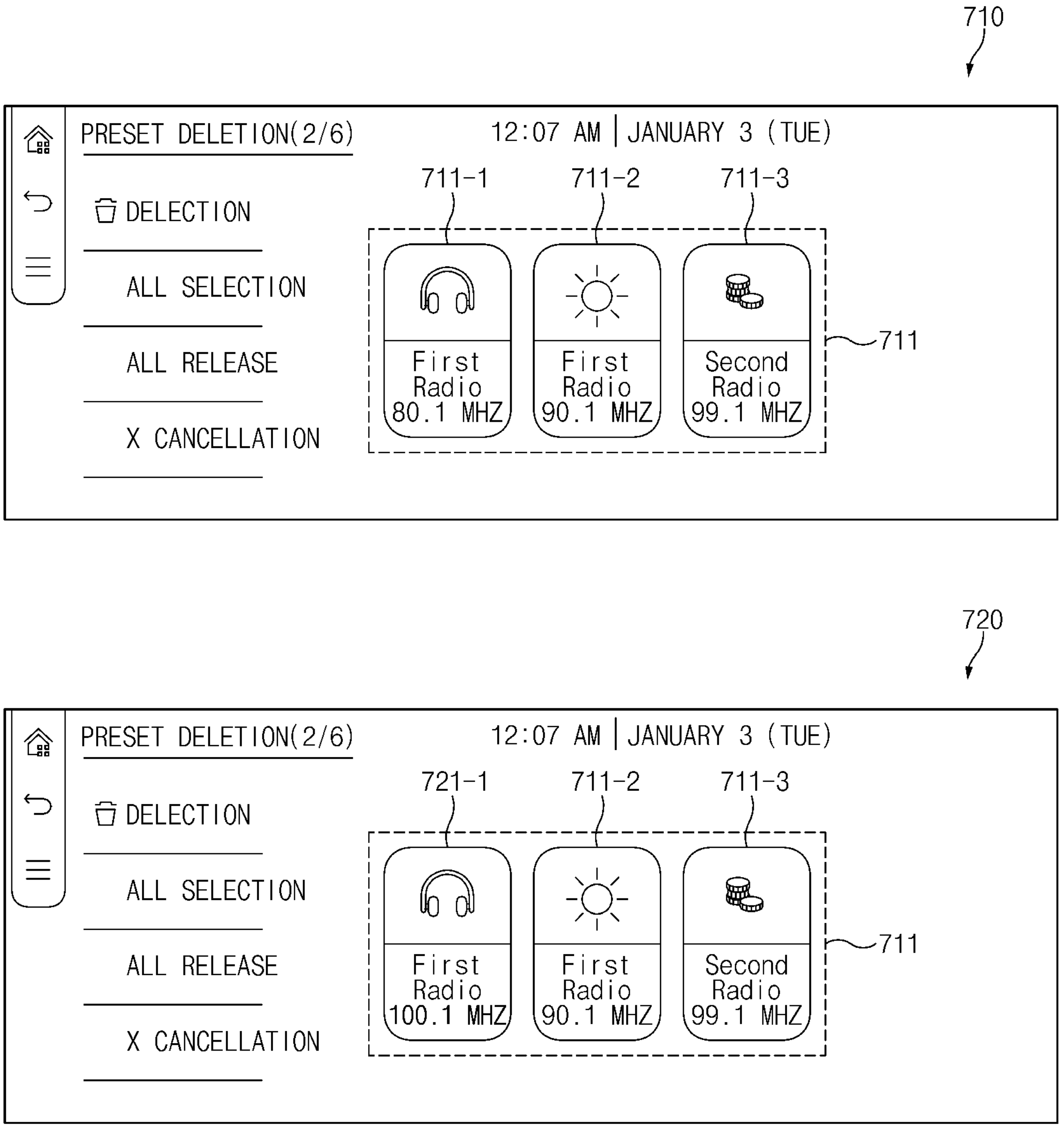
FIG. 7 is a diagram illustrating a preset list in which a preset frequency is changed to an alternative frequency.

FIG. 6 is a flowchart illustrating an operation of changing a preset frequency to an alternative frequency according to various embodiments. FIG. 7 is a diagram illustrating a preset list in which a preset frequency is changed to an alternative frequency. Operations of FIG. 6 described below may represent various examples of operation 340 of FIG. 3A. Furthermore, operations in the following embodiment may be performed sequentially or the order of each operation may be changed. Furthermore, at least two of the following operations may be performed in parallel.

Referring to FIG. 6, in operation 610, the radio system 110 (e.g., the control device 108) according to various embodiments of the present disclosure may detect movement of the vehicle 10. According to an exemplary embodiment of the present disclosure, the control device 108 may detect movement of a specified distance or more (and/or a specified speed or greater).

According to various exemplary embodiments of the present disclosure, in operation 620, the radio system 110 (e.g., the control device 108) may be configured to determine whether at least one preset frequency associated with a broadcast signal having a reception sensitivity less than the reference sensitivity is identified in the preset list 15.

According to an exemplary embodiment of the present disclosure, as indicated with reference numeral 710 in FIG. 7, a first preset frequency 711-1, a second preset frequency 711-2, and a third preset frequency 711-3 may be stored in a preset list 711. In this regard, the control device 108 may receive the first broadcast signal through the first preset frequency 711-1 and then measure the reception sensitivity of the first broadcast signal. Furthermore, the control device 108 may receive the second broadcast signal and the third broadcast signal through the second preset frequency 711-2 and the third preset frequency 711-3 and measure the reception sensitivities thereof. According to an exemplary embodiment of the present disclosure, the control device 108 may receive a broadcast signal corresponding to each preset frequency received through another tuner (e.g., the sub tuner 204) while receiving a broadcast signal of a radio broadcast currently being listened to through one tuner (e.g., the main tuner 203).

According to various exemplary embodiments of the present disclosure, when at least one preset frequency associated with a broadcast signal having a reception sensitivity less than the reference sensitivity is identified, in operation 630, the radio system 110 (e.g., the control device 108) may obtain an alternative frequency related to the at least one preset frequency identified. The alternative frequency may be another frequency (e.g., a radio frequency in another area) that transmits the same radio broadcast as the radio broadcast receivable through the preset frequency. For example, the alternative frequency may be obtained from the inside (e.g., the memory 105) or outside (e.g., the transmission station 18, server device, or the like) of the vehicle 10.

According to various exemplary embodiments of the present disclosure, after obtaining the alternative frequency, in operation 640, the radio system 110 (e.g., the control device 108) may change at least one preset frequency to an alternative frequency. In other words, as indicated with reference numeral 720 in FIG. 7, the first preset frequency 711-1 related to a broadcast signal having a reception sensitivity less than the reference sensitivity is removed from the preset list 711, and an alternative frequency 721-1 may be added to the preset list 711.

Figure 8:
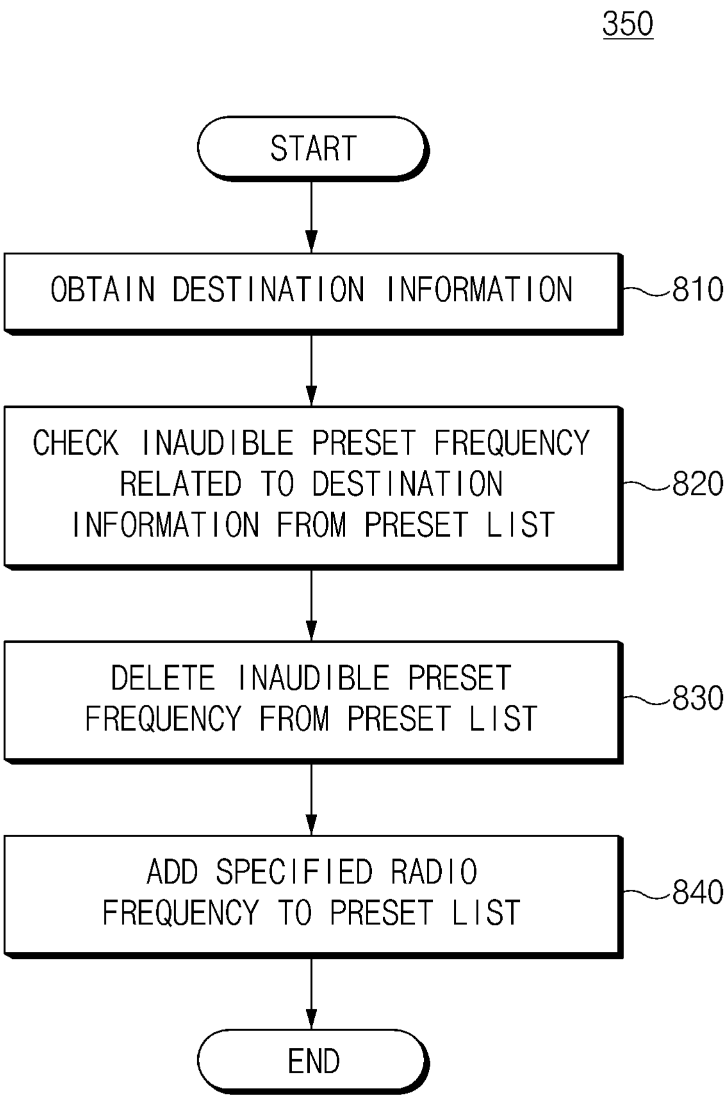
FIG. 8 is a flowchart illustrating another operation of changing a preset frequency to an alternative frequency according to various embodiments.
Figure 9:
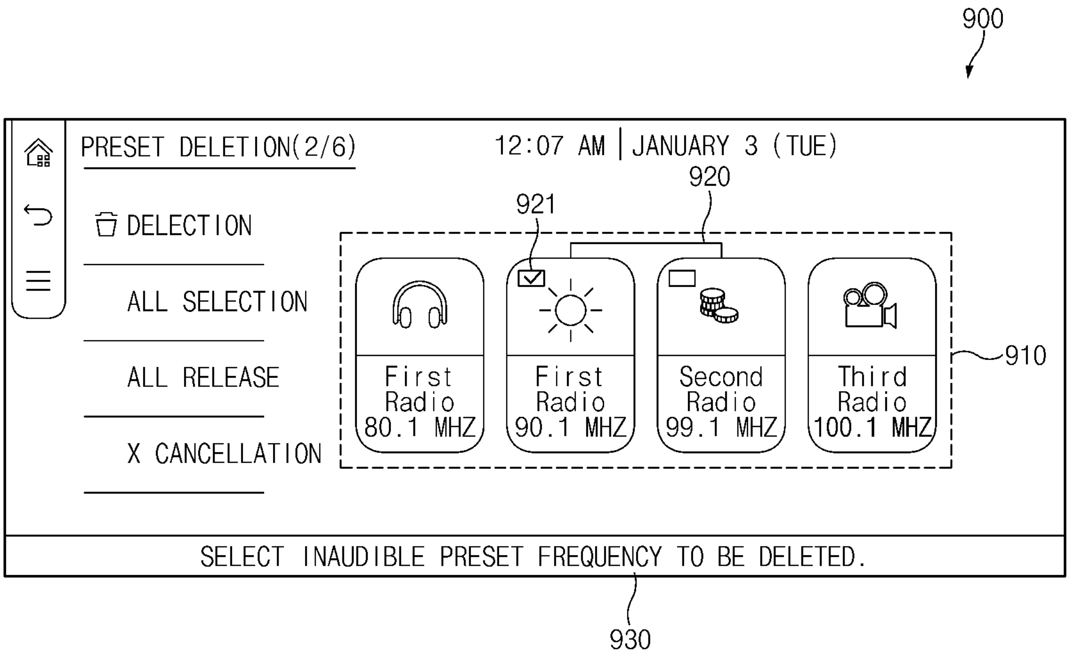
FIG. 9 is a diagram illustrating a preset list from which inaudible preset frequencies are deleted according to various embodiments.

FIG. 8 is a flowchart illustrating another operation of changing a preset frequency to an alternative frequency according to various embodiments. FIG. 9 is a diagram illustrating a preset list from which inaudible preset frequencies are deleted according to various embodiments. Operations of FIG. 8 described below may represent various examples of operation 340 of FIG. 3A. Furthermore, operations in the following embodiment may be performed sequentially or the order of each operation may be changed. Furthermore, at least two of the following operations may be performed in parallel.

Referring to FIG. 8, in operation 810, the radio system 110 (e.g., the control device 108) according to various embodiments of the present disclosure may obtain destination information of the vehicle 10. According to an exemplary embodiment of the present disclosure, the control device 108 may obtain destination information input through a navigation system.

According to various exemplary embodiments of the present disclosure, in operation 820, the radio system 110 (e.g., the control device 108) may check an inaudible preset frequency related to destination information in the preset list 15. According to an exemplary embodiment of the present disclosure, the control device 108 may store in advance whether each preset frequency included in the preset list 15 is audible in each area. For example, information indicating that the first preset frequency included in the preset frequencies is audible in the first area and not audible in the second and third areas may be stored in the inside (e.g., the memory 105) or outside (e.g., the transmission station 18, server device, or the like) of the vehicle 10.

According to various exemplary embodiments of the present disclosure, in operation 830, the radio system 110 (e.g., the control device 108) may delete an inaudible preset frequency from the preset list 15.

According to various exemplary embodiments of the present disclosure, in operation 840, the radio system 110 (e.g., the control device 108) may output a specified radio frequency to the preset list 15 instead of the deleted preset frequency. According to an exemplary embodiment of the present disclosure, a radio frequency for at least one radio broadcast receivable in a destination may be added to the preset list 15.

According to an exemplary embodiment of the present disclosure, as indicated with reference numeral 900 in FIG. 9, the control device 108 may display an inaudible preset frequency 920 included in a preset list 910 to be distinguished from other preset frequencies (e.g., audible preset frequencies). For example, the control device 108 may change the size, color, location, or at least two of those of the inaudible preset frequency 920 to distinguish it from other preset frequencies.

Additionally or alternatively, the control device 108 may output information 930 informing that an inaudible preset frequency may be selected and deleted. Accordingly, the occupant may select at least one inaudible preset frequency 930 using a selection icon 921, and the control device 108 may delete the preset frequency selected by the occupant from the preset list 910.

Figure 10:
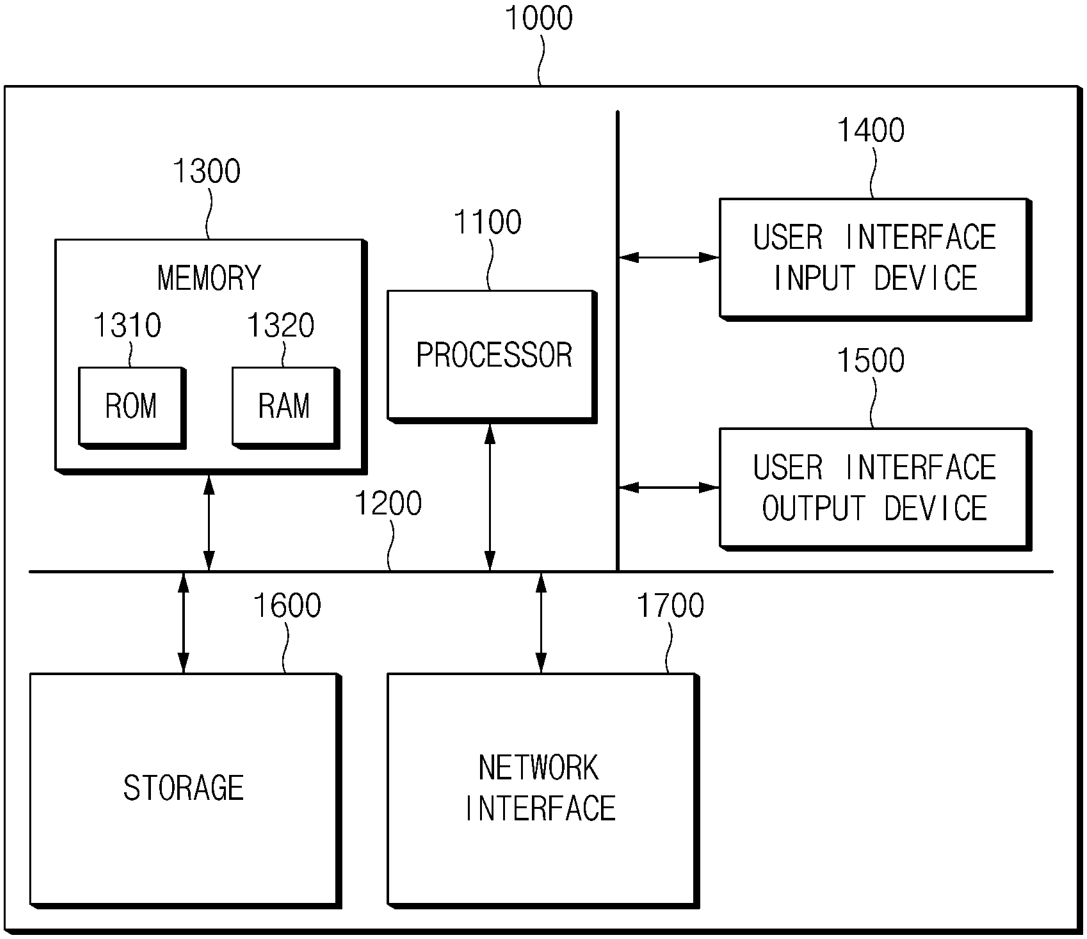
FIG. 10 is a block diagram illustrating a determining system according to an exemplary embodiment of the present disclosure.

FIG. 10 is a block diagram illustrating a computing system according to an exemplary embodiment of the present disclosure.

Referring to FIG. 10, a computing system 1000 may include at least one processor 1100, a memory 1300, a user interface input device 1400, a user interface output device 1500, storage 1600, and a network interface 1700 connected through a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Accordingly, the processes of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

The radio system according to an exemplary embodiment of the present disclosure may store not only relatively low radio frequencies but also relatively high radio frequencies among receivable radio frequencies in a preset list by excluding radio frequencies of the same radio broadcast that are duplicated from the preset list.

Furthermore, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the present disclosure.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A radio system comprising:
an audio device; and
a control device operatively connected to the audio device to store a first radio frequency of the audio device as a preset frequency,
wherein the control device is configured to:
determine whether a second broadcast signal received through a second radio frequency is equal to a first broadcast signal received through the first radio frequency stored in a preset list in response that the second radio frequency of the audio device is added as the preset frequency,
generate the preset list including the first radio frequency and the second radio frequency in response that the first broadcast signal is different from the second broadcast signal, and
generate the preset list including the first radio frequency or the second radio frequency in response that the first broadcast signal and the second broadcast signal are broadcast signals of a same radio broadcast,
wherein the control device is further configured to:
select the second radio frequency corresponding to the second broadcast signal having a reception sensitivity higher than or equal to a reference sensitivity while changing the first radio frequency at a predetermined interval; and
add the selected second radio frequency as the preset frequency.

2. The radio system of claim 1, wherein the control device is further configured to:
output a user interface operatively connected to the control device for radio frequency selection; and
change the first radio frequency to the second radio frequency based on an input to the user interface and add the changed second radio frequency as the preset frequency.

3. The radio system of claim 1, wherein the control device is further configured to:
upon concluding that the first broadcast signal and the second broadcast signal are broadcast signals of the same radio broadcast,
obtain location information related to a vehicle, and
generate the preset list by selecting one of the first radio frequency or the second radio frequency based on the location information.

4. The radio system of claim 1,
wherein the control device is further configured to:
check at least one preset frequency related to a broadcast signal having a reception sensitivity less than a reference sensitivity in the preset list in response that movement of a vehicle is detected; and
change the at least one preset frequency to an alternative frequency, and
wherein the alternative frequency includes another radio frequency through which the same radio broadcast as a radio broadcast received through the at least one preset frequency is transmitted.

5. The radio system of claim 4, wherein the control device is further configured to:
obtain information on the alternative frequency associated with the at least one preset frequency from inside the radio system or outside the radio system.

6. The radio system of claim 4, wherein the control device is further configured to:
check a current location of the vehicle; and
check the information on the alternative frequency corresponding to the current location of the vehicle.

7. The radio system of claim 1,
wherein the control device is further configured to:
check an inaudible preset frequency related to a moving path of a vehicle from the preset list; and
change the inaudible preset frequency to a predetermined radio frequency, and
wherein the predetermined radio frequency includes audible radio frequencies of other radio broadcasts on the moving path.

8. The radio system of claim 7, further including:
a display operatively connected to the control device and configured to output the preset list,
wherein the control device is further configured to output the inaudible preset frequency in a first scheme and output other preset frequencies excluding the inaudible preset frequency in a second scheme in the preset list output to the display.

9. The radio system of claim 7, further including:
an input device operatively connected to the control device,
wherein the control device is further configured to change the inaudible preset frequency selected through the input device to the predetermined radio frequency.

10. A method of operation a radio system, the method comprising:
storing, by a control device of the radio system, a first radio frequency of an audio device as a preset frequency;
determining, by the control device, whether a second broadcast signal received through a second radio frequency is equal to a first broadcast signal received through the first radio frequency stored in a preset list in response that the second radio frequency of the audio device is added as the preset frequency;
generating, by the control device, the preset list including the first radio frequency and the second radio frequency in response that the first broadcast signal is different from the second broadcast signal;
generating, by the control device, the preset list including the first radio frequency or the second radio frequency in response that the first broadcast signal and the second broadcast signal are broadcast signals of a same radio broadcast;
selecting, by the control device, the second radio frequency corresponding to the second broadcast signal having a reception sensitivity higher than or equal to a reference sensitivity while changing the first radio frequency at a predetermined interval; and
adding, by the control device, the selected second radio frequency as the preset frequency.

11. The method of claim 10, further including:
outputting, by the control device, a user interface operatively connected to the control device for radio frequency selection; and
changing, by the control device, the first radio frequency to the second radio frequency based on an input to the user interface and adding the changed second radio frequency as the preset frequency.

12. The method of claim 10, further including:
upon concluding that the first broadcast signal and the second broadcast signal are broadcast signals of the same radio broadcast, obtaining, by the control device, location information related to a vehicle, and generating, by the control device, the preset list by selecting one of the first radio frequency or the second radio frequency based on the location information.

13. The method of claim 10, further including:

checking, by the control device, at least one preset frequency related to a broadcast signal having a reception sensitivity less than a reference sensitivity in the preset list in response that movement of a vehicle is detected; and changing, by the control device, the at least one preset frequency to an alternative frequency, wherein the alternative frequency includes another radio frequency through which the same radio broadcast as a radio broadcast received through the at least one preset frequency is transmitted.

14. The method of claim 13, further including:

obtaining, by the control device, information on the alternative frequency associated with the at least one preset frequency from inside the radio system or outside the radio system.

15. The method of claim 13, further including:

checking, by the control device, a current location of the vehicle; and checking, by the control device, the information on the alternative frequency corresponding to the current location of the vehicle.

16. The method of claim 10, further including:

checking, by the control device, an inaudible preset frequency related to a moving path of a vehicle from the preset list; and changing, by the control device, the inaudible preset frequency to a predetermined radio frequency, wherein the predetermined radio frequency includes audible radio frequencies of other radio broadcasts on the moving path.

17. The method of claim 16, further including:

outputting, by the control device, the preset list; and outputting, by the control device, the inaudible preset frequency in a first scheme and outputting other preset frequencies excluding the inaudible preset frequency in a second scheme in the preset list output to the display.

18. The method of claim 16, further including:

changing, by the control device, the inaudible preset frequency selected through an input device operatively connected to the control device to the predetermined radio frequency.

* * * * *